(12) United States Patent
Gyoda et al.

(10) Patent No.: US 10,466,473 B2
(45) Date of Patent: Nov. 5, 2019

(54) OPTICAL SYSTEM AND IMAGE PICKUP APPARATUS INCLUDING THE SAME

(71) Applicant: CANON KABUSHIKI KAISHA, Tokyo (JP)

(72) Inventors: Yuichi Gyoda, Utsunomiya (JP); Suguru Inoue, Utsunomiya (JP); Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 55 days.

(21) Appl. No.: 15/607,282

(22) Filed: May 26, 2017

(65) Prior Publication Data

US 2017/0351089 A1    Dec. 7, 2017

(30) Foreign Application Priority Data

Jun. 1, 2016  (JP) .................. 2016-109656

(51) Int. Cl.
*G02B 27/00* (2006.01)
*G02B 26/08* (2006.01)
*G02B 13/02* (2006.01)
*G02B 13/18* (2006.01)

(52) U.S. Cl.
CPC ......... *G02B 27/0025* (2013.01); *G02B 13/02* (2013.01); *G02B 13/18* (2013.01); *G02B 26/08* (2013.01)

(58) Field of Classification Search
CPC .... G02B 27/00; G02B 27/0025; G02B 26/08; G02B 15/173; G02B 13/02; G02B 13/0035; G02B 9/12; G02B 9/14; G02B 13/18

USPC ....... 359/689, 716, 690, 748, 753, 784, 785, 359/786, 788
See application file for complete search history.

(56) References Cited

U.S. PATENT DOCUMENTS

| | | | | |
|---|---|---|---|---|
| 2011/0299179 A1* | 12/2011 | Maetaki | ................ | G02B 7/08 359/754 |
| 2012/0229921 A1* | 9/2012 | Eguchi | ............... | G02B 15/163 359/771 |
| 2015/0109519 A1 | 4/2015 | Fujikura | | |
| 2015/0316755 A1 | 11/2015 | Takemoto | | |

(Continued)

FOREIGN PATENT DOCUMENTS

| | | |
|---|---|---|
| JP | 2012-047870 A | 3/2012 |
| JP | 2015-215559 A | 12/2015 |

(Continued)

*Primary Examiner* — Jie Lei
(74) *Attorney, Agent, or Firm* — Canon U.S.A., Inc. IP Division

(57) ABSTRACT

An optical system includes a first lens unit that has a positive refractive power; a second lens unit that is arranged to move during focusing and has a positive or negative refractive power; and a third lens unit that has a positive or negative refractive power. The first lens unit, the second lens unit, and the third lens unit are disposed in that order from an object side to an image side. During the focusing, an interval between adjacent lens units changes. In the optical system, a focal length f of the entire optical system, a distance LD along an optical axis from a lens surface of the first lens unit that is closest to the object side to an image plane, a material of positive lenses included in the first lens unit, and an arrangement of the positive lenses included in the first lens unit are appropriately set.

13 Claims, 29 Drawing Sheets

(56) References Cited

U.S. PATENT DOCUMENTS

| | | | |
|---|---|---|---|
| 2016/0054549 A1 | 2/2016 | Takemoto | |
| 2016/0109690 A1 | 4/2016 | Ogata et al. | |

FOREIGN PATENT DOCUMENTS

| | | |
|---|---|---|
| JP | 2016-148707 A | 8/2016 |
| JP | 2016-161641 A | 9/2016 |
| JP | 2016-161644 A | 9/2016 |

\* cited by examiner

OPTICAL SYSTEM AND IMAGE PICKUP APPARATUS INCLUDING THE SAME

BACKGROUND OF THE INVENTION

Field of the Invention

The present invention relates to an optical system and to an image pickup apparatus including the optical system, and is suitable for image pickup apparatuses, such as digital still cameras, video cameras, monitoring cameras, or broadcasting cameras, using image pickup elements, or for image pickup apparatuses, such as cameras using silver-halide photographic films.

Description of the Related Art

As an image taking optical system having a long focal length, a so-called telephoto-type image taking optical system, in which an optical system having a positive refractive power is disposed on an object side and an optical system having a negative refractive power is disposed on an image side, is known. Such a telephoto-type image taking optical system is used in, for example, a super-telephoto lens having a fixed focal length.

In a super-telephoto lens, in general, as the focal length increases, axial chromatic aberration and chromatic aberration of magnification occur frequently. As a known method of properly correcting such chromatic aberrations, a material having low dispersion and anomalous dispersion is used as the material of a positive lens that is disposed closest to the object side.

In the optical system in Japanese Patent Laid-Open No. 2015-215559, the positive lens L11 and the positive lens L12, which are made of a material having low dispersion and anomalous dispersion, are successively disposed from the object side. Here, the material used as the material of the positive lenses and having low dispersion and anomalous dispersion generally has low scratch resistance. Therefore, in the optical system in Japanese Patent Laid-Open No. 2015-215559, a cover glass is disposed on the object side of the positive lens L11, so that shock or the like from outside the positive lens L11 is unlikely to be applied to the positive lens L11.

In the optical system in Japanese Patent Laid-Open No. 2015-215559, the positive lens L11 and the positive lens L12 are disposed at locations where the incident heights of an on-axis ray and an off-axis ray are large to properly correct chromatic aberration. However, the effective diameter of the positive lens L11 and the effective diameter of the positive lens L12 tend to be large, as a result of which the optical system tends to become heavy.

In order to further reduce the weight of the optical system, it is important to dispose the positive lenses that are made of a material having low dispersion and anomalous dispersion at proper locations.

SUMMARY OF THE INVENTION

The present invention provides an optical system that is light and whose aberrations, such as chromatic aberration, are properly corrected, and an image pickup apparatus including the optical system.

An optical system according to an aspect of the present invention includes a first lens unit having a positive refractive power, a second lens unit having a positive refractive power or a negative refractive power, and a third lens unit having a positive refractive power or a negative refractive power. The first lens unit, the second lens unit, and the third lens unit are disposed in that order from an object side to an image side. During focusing, the second lens unit is arranged to move to change an interval between adjacent lens units. The first lens unit includes a positive lens G1p that is disposed closest to the object side, a positive lens G2p that is disposed closer to the image side than the positive lens G1p, and a positive lens G3p that is disposed closer to the image side than the positive lens G2p. When a focal length of the optical system is f, a distance along an optical axis from a lens surface of the first lens unit that is closest to the object side to an image plane is LD, a distance along the optical axis between the positive lens G1p and a lens that is disposed adjacent to the image side of the positive lens G1p is D12, an Abbe number of a material of the positive lens G2p is vdG2p, and an Abbe number of a material of the positive lens G3p is vdG3p, the following conditional expressions are satisfied:

$LD/f<1.0;$ $0.200 \leq D12/LD<0.500;$ $vdG2p>73.0;$ and $vdG3p>73.0.$

An optical system according to another aspect of the present invention includes a first lens unit having a positive refractive power, a second lens unit having a positive refractive power or a negative refractive power, and a third lens unit having a positive refractive power or a negative refractive power. The first lens unit, the second lens unit, and the third lens unit are disposed in that order from an object side to an image side. During focusing, the second lens unit is arranged to move to change an interval between adjacent lens units. The first lens unit includes a positive lens G1p that is disposed closest to the object side, a positive lens G2p that is disposed adjacent to the image side of the positive lens G1p, and a positive lens G3p that is disposed closer to the image side than the positive lens G2p. When a focal length of the optical system is f, a distance along an optical axis from a lens surface of the first lens unit that is closest to the object side to an image plane is LD, a distance along the optical axis between the positive lens G1p and the positive lens G2p is D12, an Abbe number of a material of the positive lens G2p is vdG2p, and an Abbe number of a material of the positive lens G3p is vdG3p, the following conditional expressions are satisfied:

$LD/f<1.0;$ $0.170<D12/LD<0.500;$ $vdG2p>73.0;$ and $vdG3p>73.0.$

An optical system according to still another aspect of the present invention includes a first lens unit having a positive refractive power, a second lens unit having a positive refractive power or a negative refractive power; and a third lens unit having a positive refractive power or a negative refractive power. The first lens unit, the second lens unit, and the third lens unit are disposed in that order from an object side to an image side. During focusing, the second lens unit moves to change an interval between adjacent lens units. The first lens unit includes a positive lens G1p that is disposed closest to the object side, a positive lens G2p that is disposed closer to the image side than the positive lens G1p, a positive lens G3p that is disposed closer to the image side than the positive lens G2p, and at least one negative lens. When a focal length of the optical system is f, a distance along an optical axis from a lens surface of the first lens unit that is closest to the object side to an image plane is LD, a distance along the optical axis between the positive lens G1p and a lens that is disposed adjacent to the image side of the positive lens G1p is D12, an Abbe number of a material of the positive lens G2p is vdG2p, an Abbe number of a material of the positive lens G3p is vdG3p, a focal length of the positive lens G1p is fG1p, and a focal length of a negative lens G1n that is disposed closest to the object side among the at least one negative lens included in the first lens unit is fG1n, the following conditional expressions are satisfied:

$LD/f<1.0$ $0.170<D12/LD<0.500$ $vdG2p>73.0$ $vdG3p>73.0$ $1.80<|fG1p/fG1n|<10.00.$

An image pickup apparatus according to still another aspect of the present invention includes an optical system, and an image pickup element arranged to receive an image that is formed by the optical system. The optical system includes a first lens unit having a positive refractive power, a second lens unit having a positive refractive power or a negative refractive power; and a third lens unit having a positive refractive power or a negative refractive power. The first lens unit, the second lens unit, and the third lens unit are disposed in that order from an object side to an image side. During focusing, the second lens unit is arranged to move to change an interval between adjacent lens units. The first lens unit includes a positive lens G1p that is disposed closest to the object side, a positive lens G2p that is disposed closer to the image side than the positive lens G1p, and a positive lens G3p that is disposed closer to the image side than the positive lens G2p. When a focal length of the optical system is f, a distance along an optical axis from a lens surface of the first lens unit that is closest to the object side to an image plane is LD, a distance along the optical axis between the positive lens G1p and a lens that is disposed adjacent to the image side of the positive lens G1p is D12, an Abbe number of a material of the positive lens G2p is vdG2p, and an Abbe number of a material of the positive lens G3p is vdG3p, the following conditional expressions are satisfied:

$LD/f<1.0;$ $0.200 \leq D12/LD<0.500;$ $vdG2p>73.0;$ and $vdG3p>73.0.$

Further features of the present invention will become apparent from the following description of exemplary embodiments with reference to the attached drawings.

DESCRIPTION OF THE EMBODIMENTS

Optical systems and an image pickup apparatus including such optical systems according to embodiments of the present invention are described in detail below with reference to the attached drawings. The optical system according to each embodiment includes a first lens unit having a positive refractive power, a second lens unit having a positive refractive power or a negative refractive power, and a third lens unit having a positive refractive power or a negative refractive power, which are disposed in that order from an object side to an image side. During focusing, the second lens unit moves to change the interval between adjacent lens units. Here, the term "lens unit" refers to a lens element that moves integrally during focusing. The lens units include one or more lenses. The lens units need not include a plurality of lenses.

FIGS. 1, 3, 5, 7, 9, 11, 13, 15, 17, 19, 21, 23, 25, and 27 are sectional views of optical systems according to corresponding first to fourteenth embodiments. FIGS. 2, 4, 6, 8, 10, 12, 14, 16, 18, 20, 22, 24, 26, and 28 illustrate aberrations of the optical systems according to the corresponding first to fourteenth embodiments when the corresponding optical systems are focused at infinity.

Figure 1:
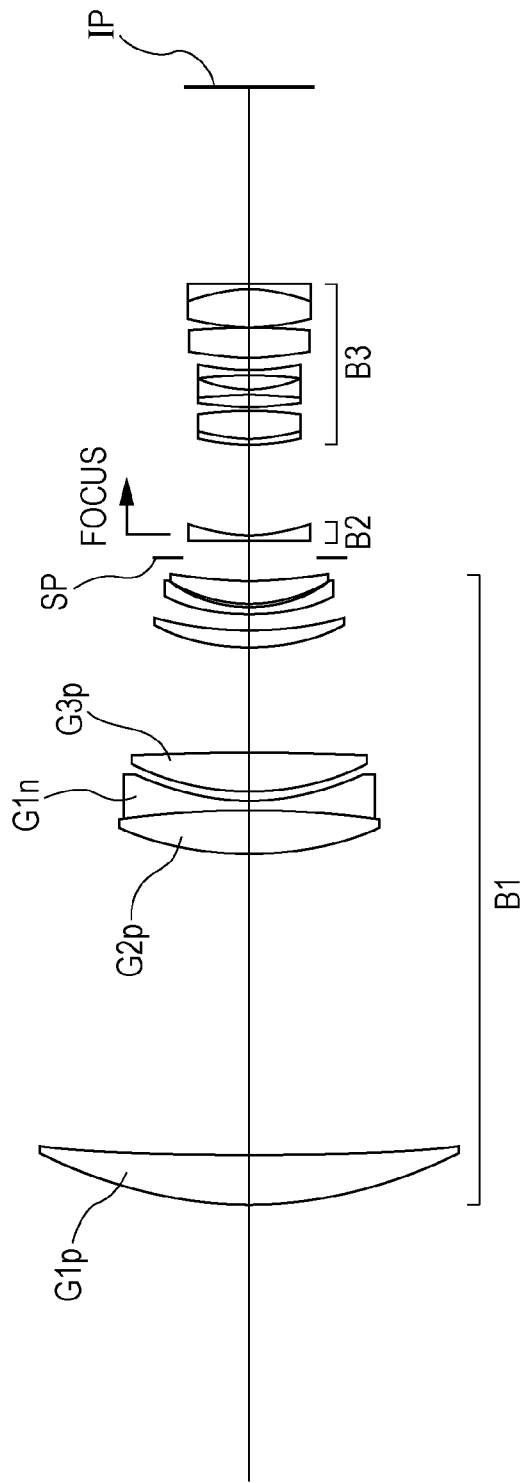
FIG. 1 is a sectional view of lenses of an optical system according to a first embodiment.
Figure 2:
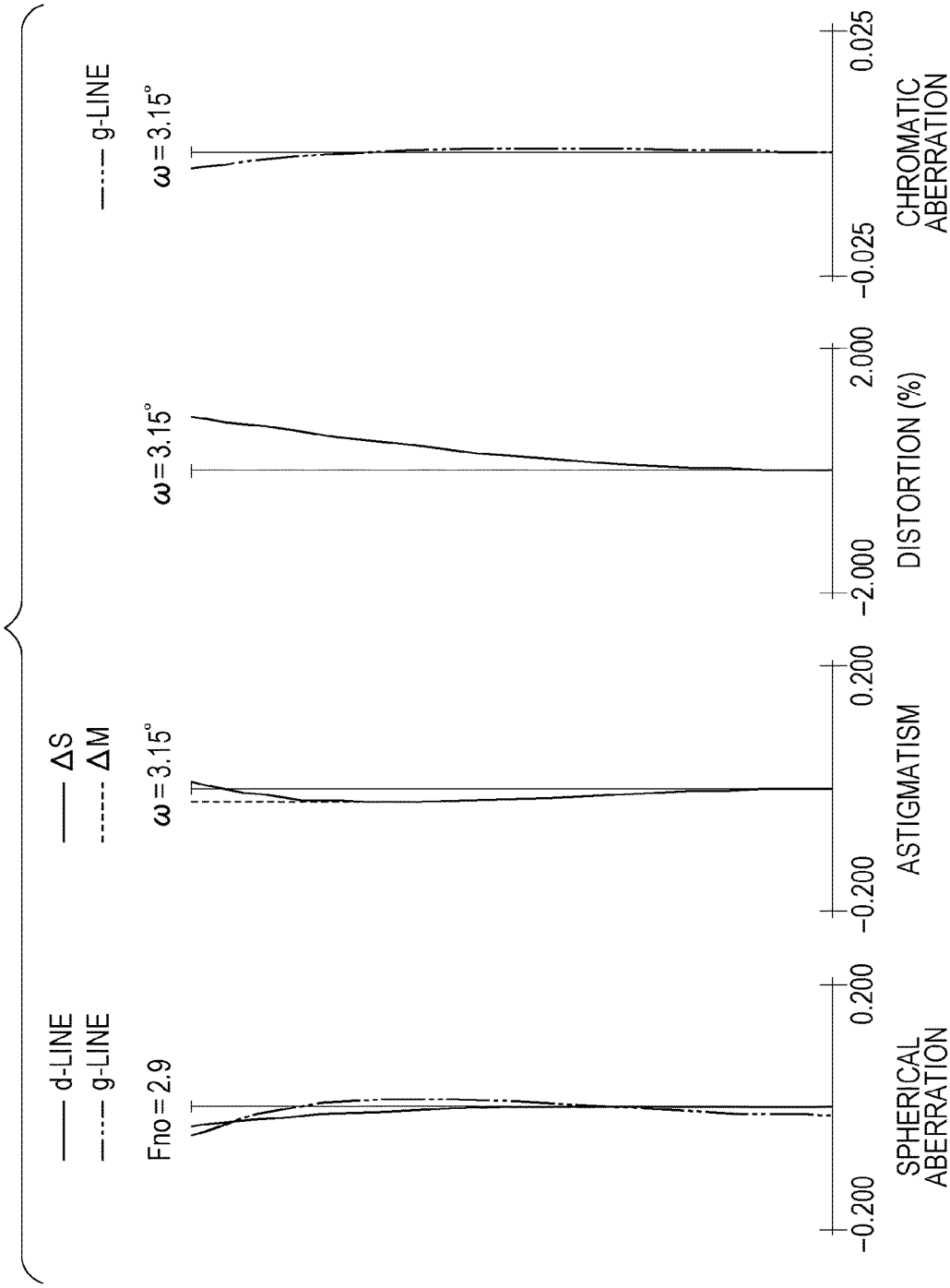
FIG. 2 illustrates aberrations of the optical system according to the first embodiment when the optical system is focused at infinity.
Figure 3:
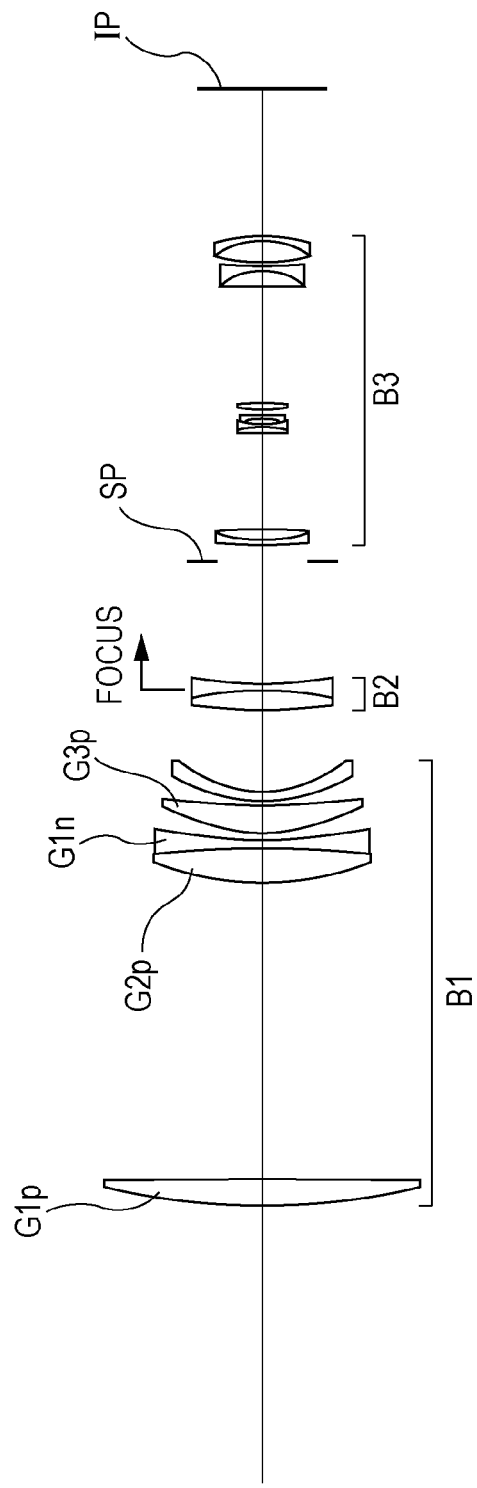
FIG. 3 is a sectional view of lenses of an optical system according to a second embodiment.
Figure 4:
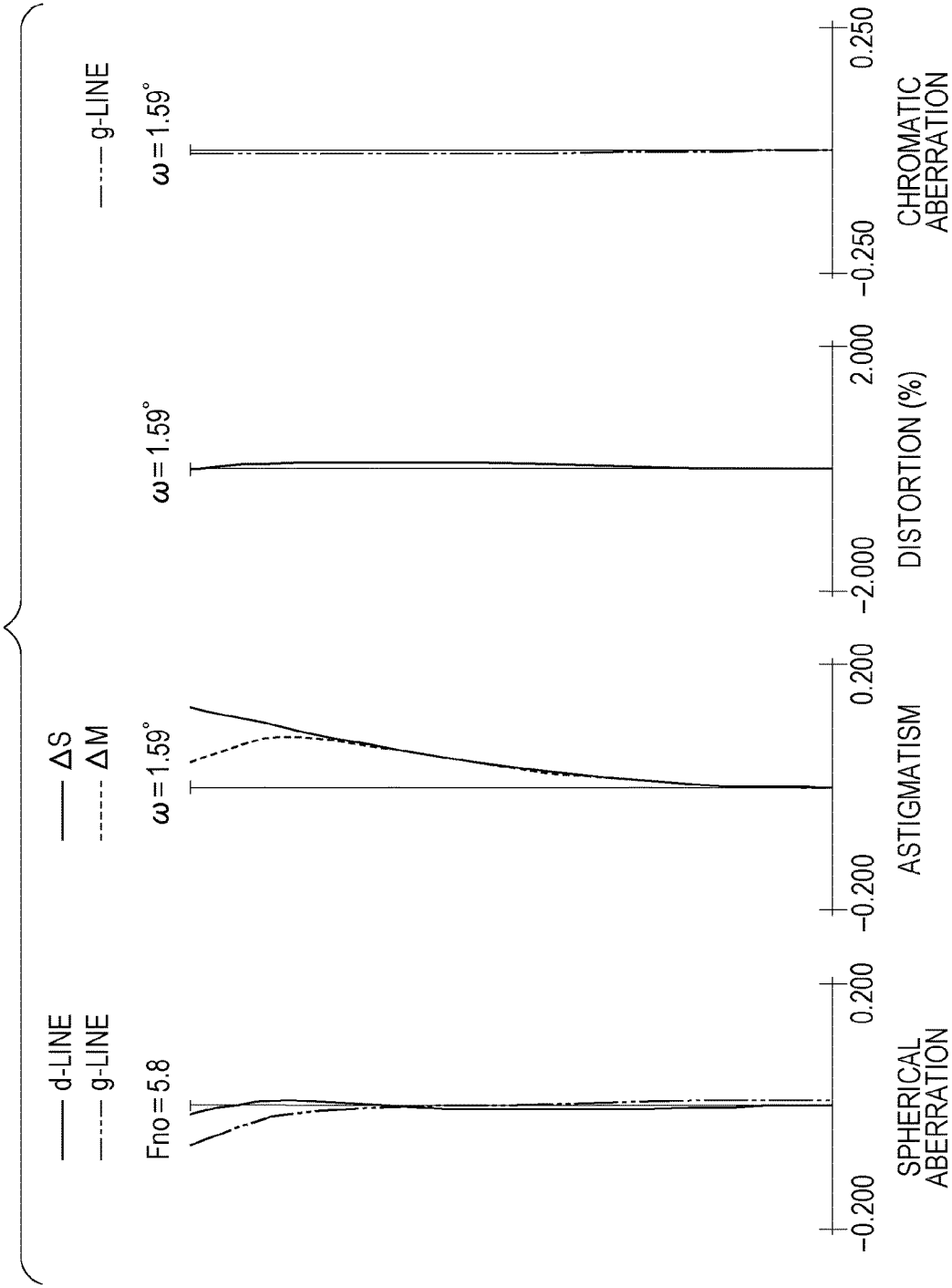
FIG. 4 illustrates aberrations of the optical system according to the second embodiment when the optical system is focused at infinity.
Figure 5:
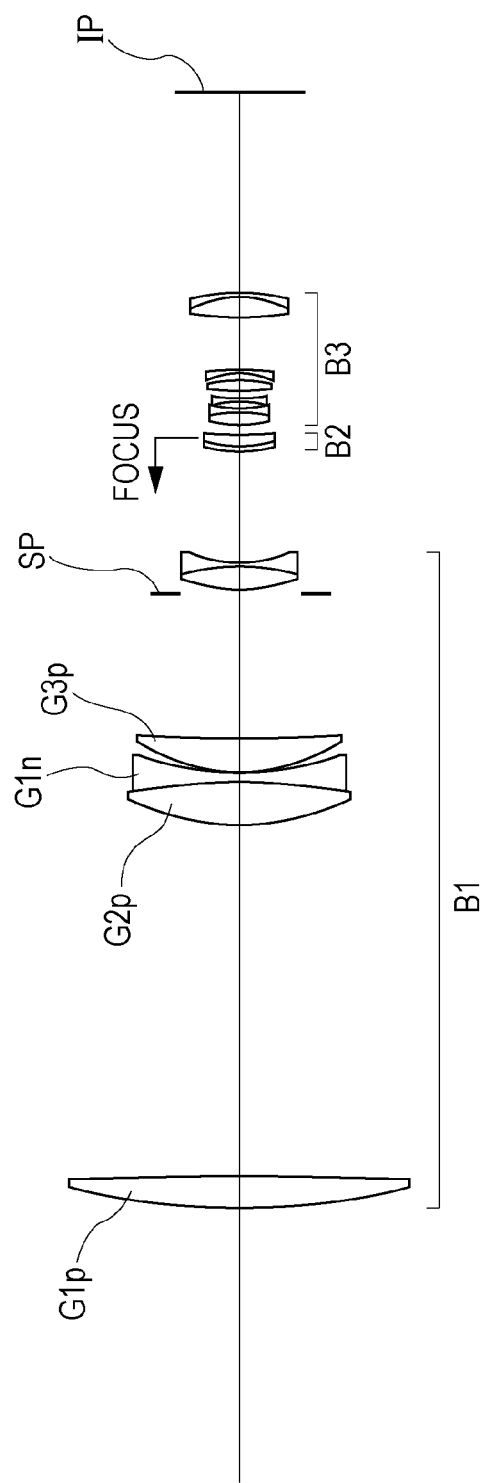
FIG. 5 is a sectional view of lenses of an optical system according to a third embodiment.
Figure 6:
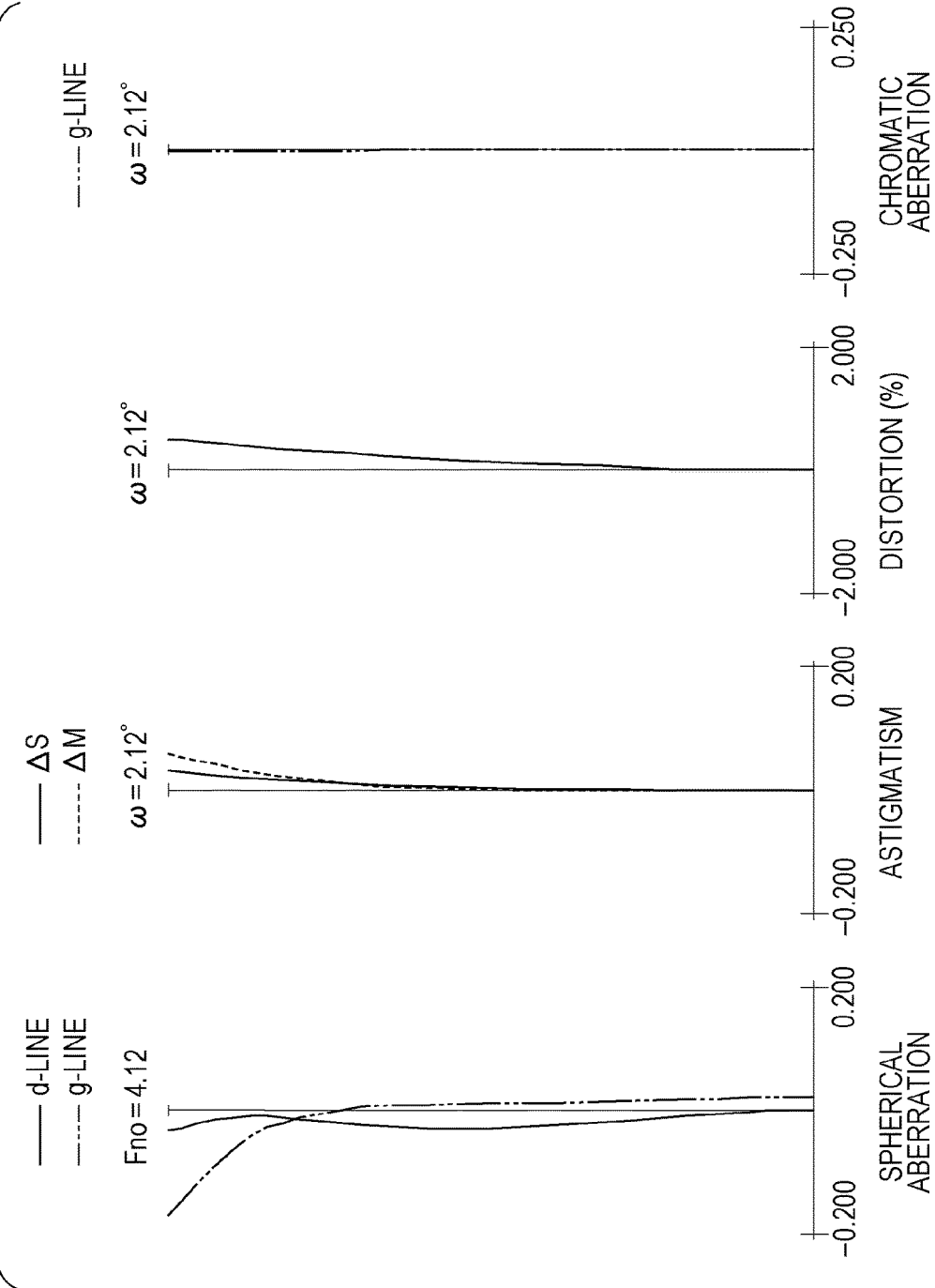
FIG. 6 illustrates aberrations of the optical system according to the third embodiment when the optical system is focused at infinity.
Figure 7:
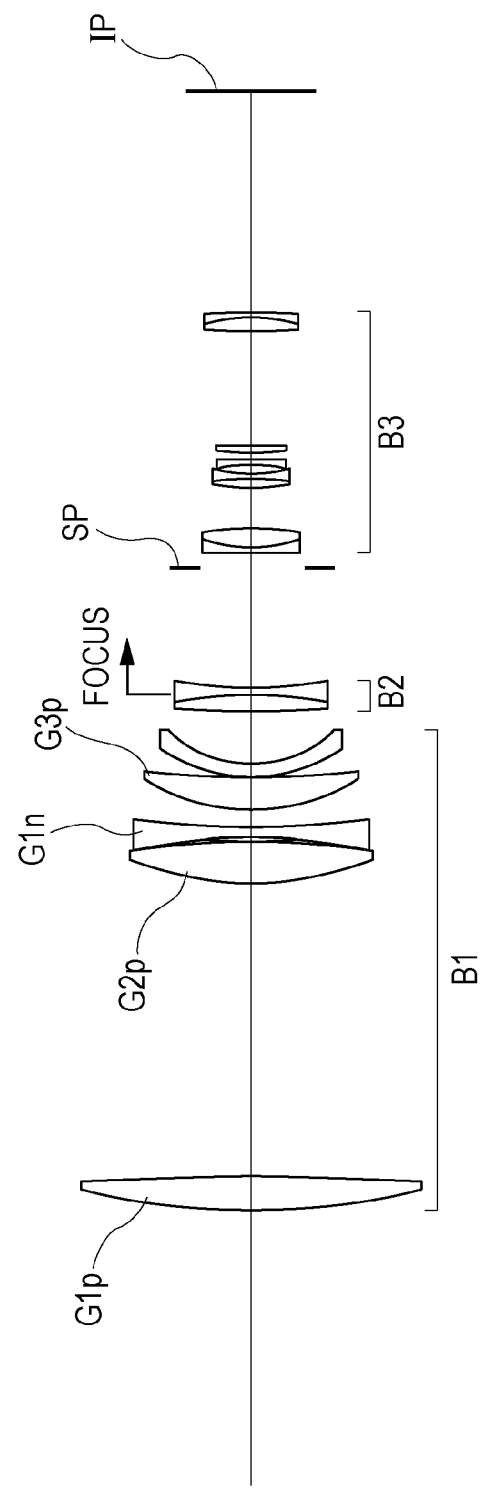
FIG. 7 is a sectional view of lenses of an optical system according to a fourth embodiment.
Figure 8:
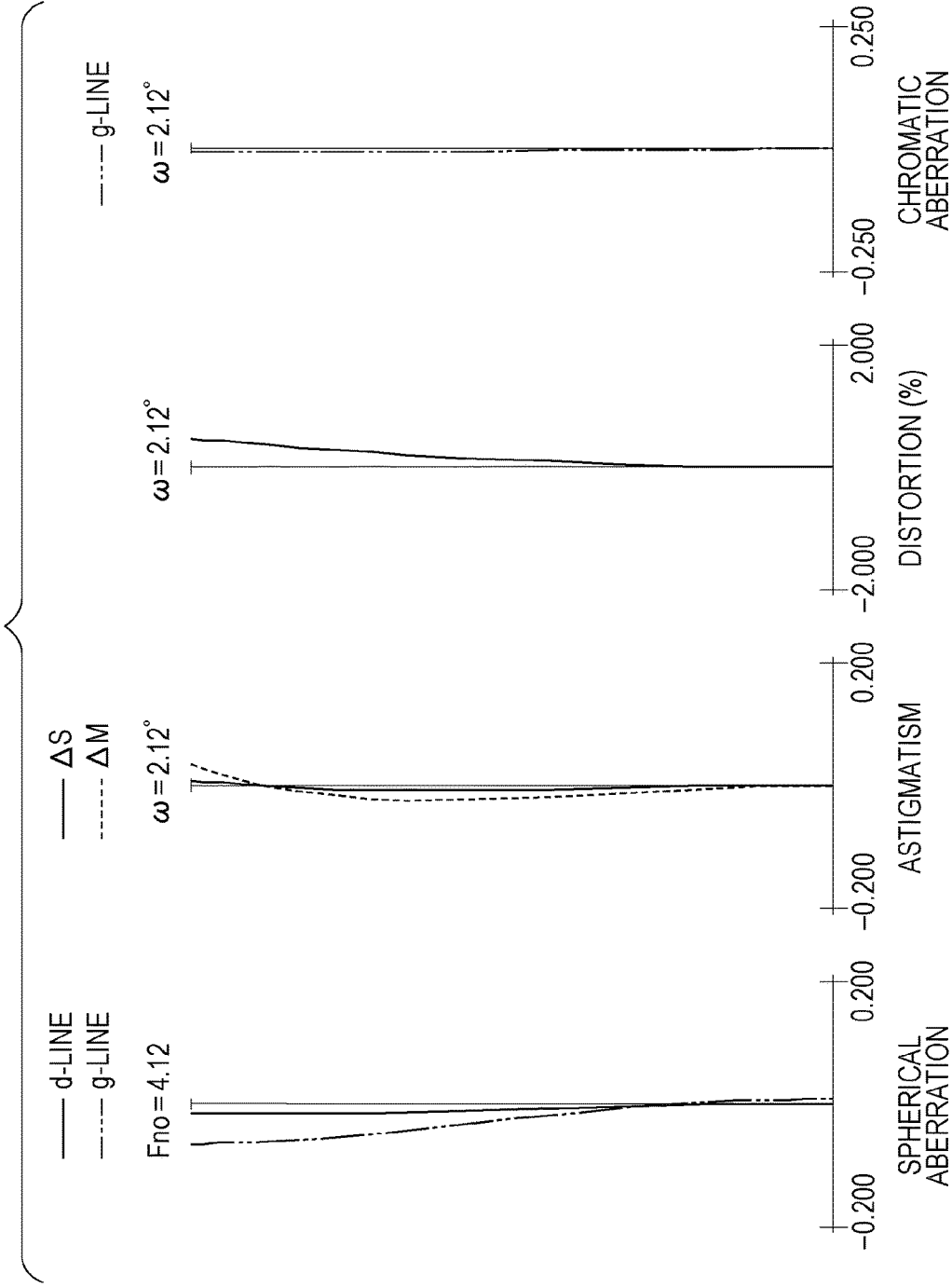
FIG. 8 illustrates aberrations of the optical system according to the fourth embodiment when the optical system is focused at infinity.
Figure 9:
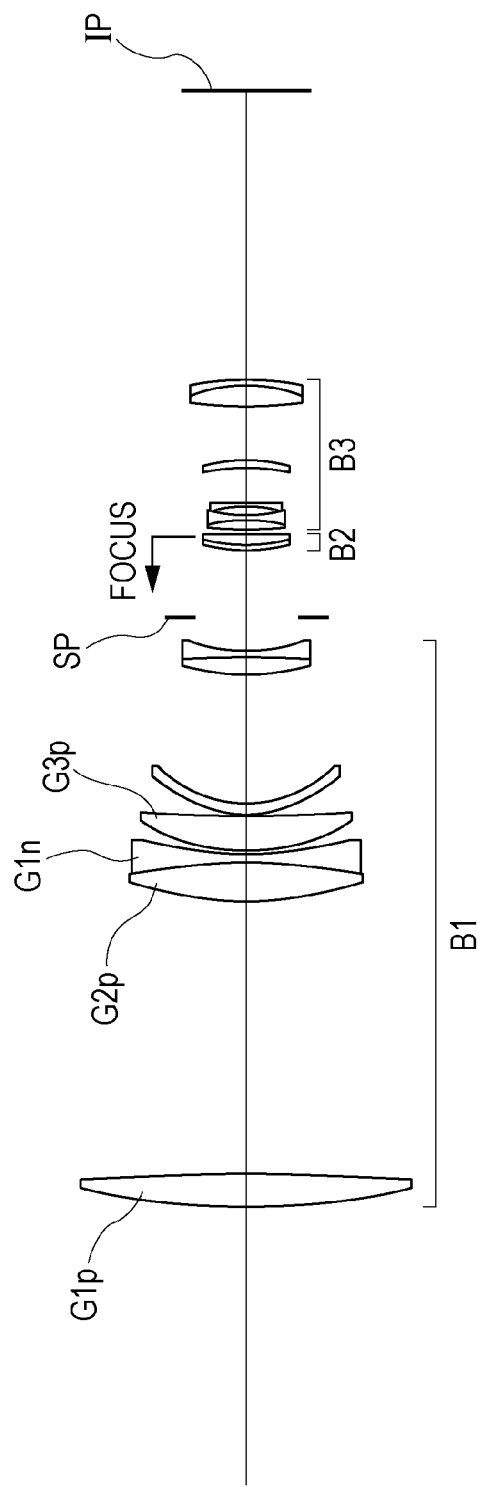
FIG. 9 is a sectional view of lenses of an optical system according to a fifth embodiment.
Figure 10:
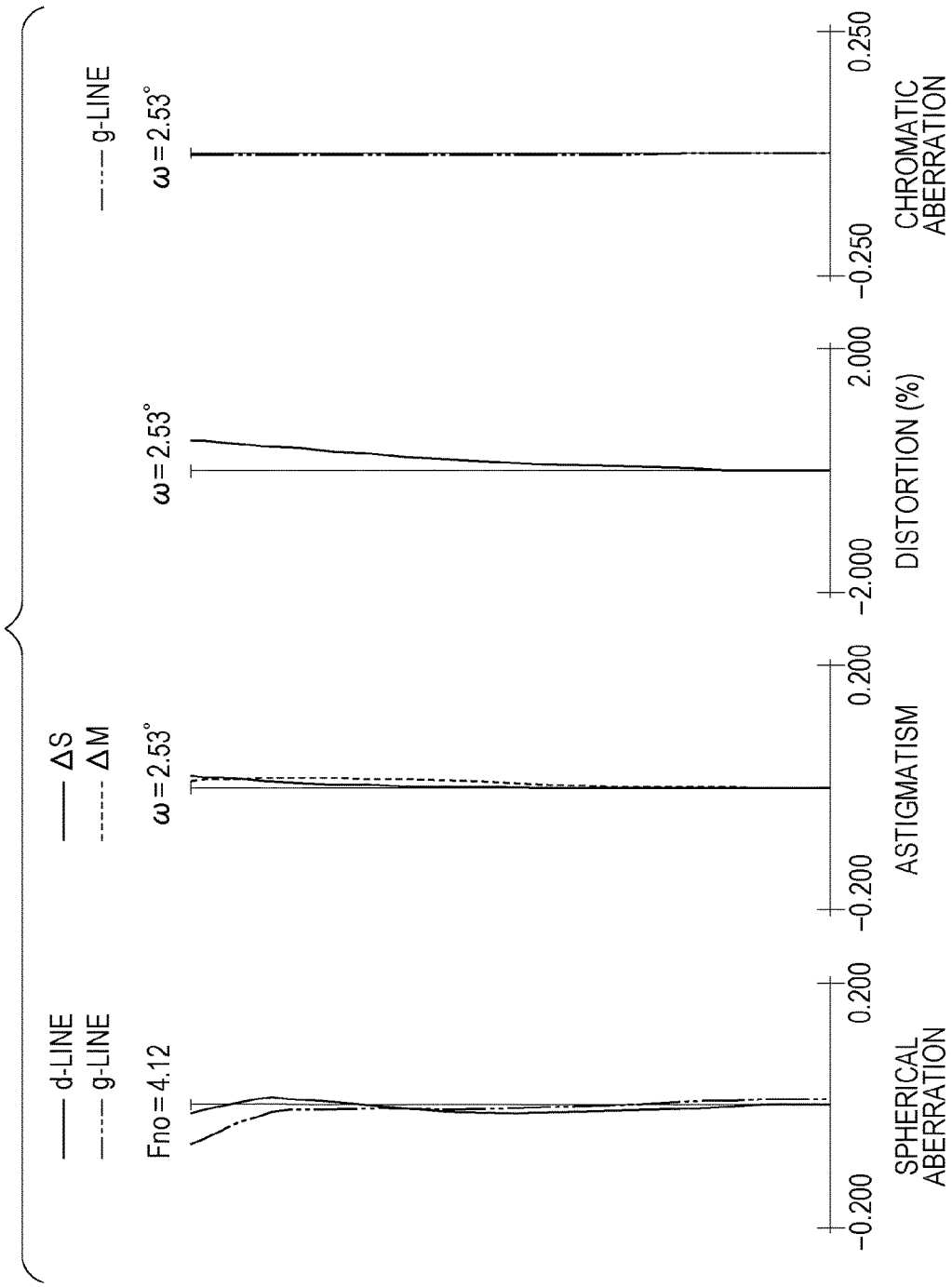
FIG. 10 illustrates aberrations of the optical system according to the fifth embodiment when the optical system is focused at infinity.
Figure 11:
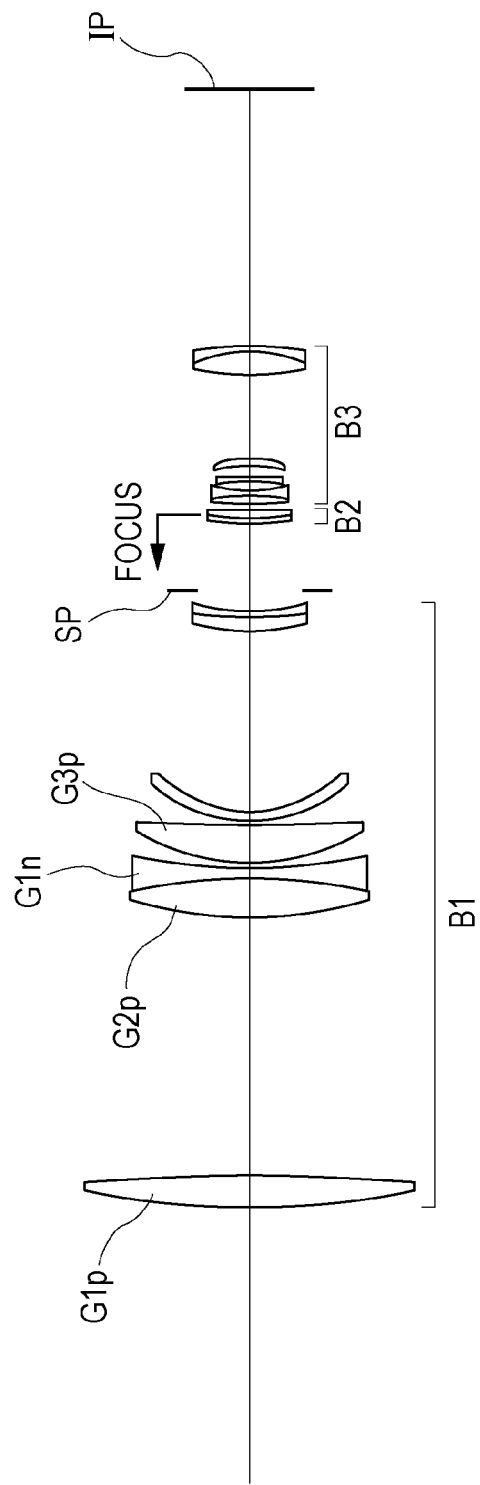
FIG. 11 is a sectional view of lenses of an optical system according to a sixth embodiment.
Figure 12:
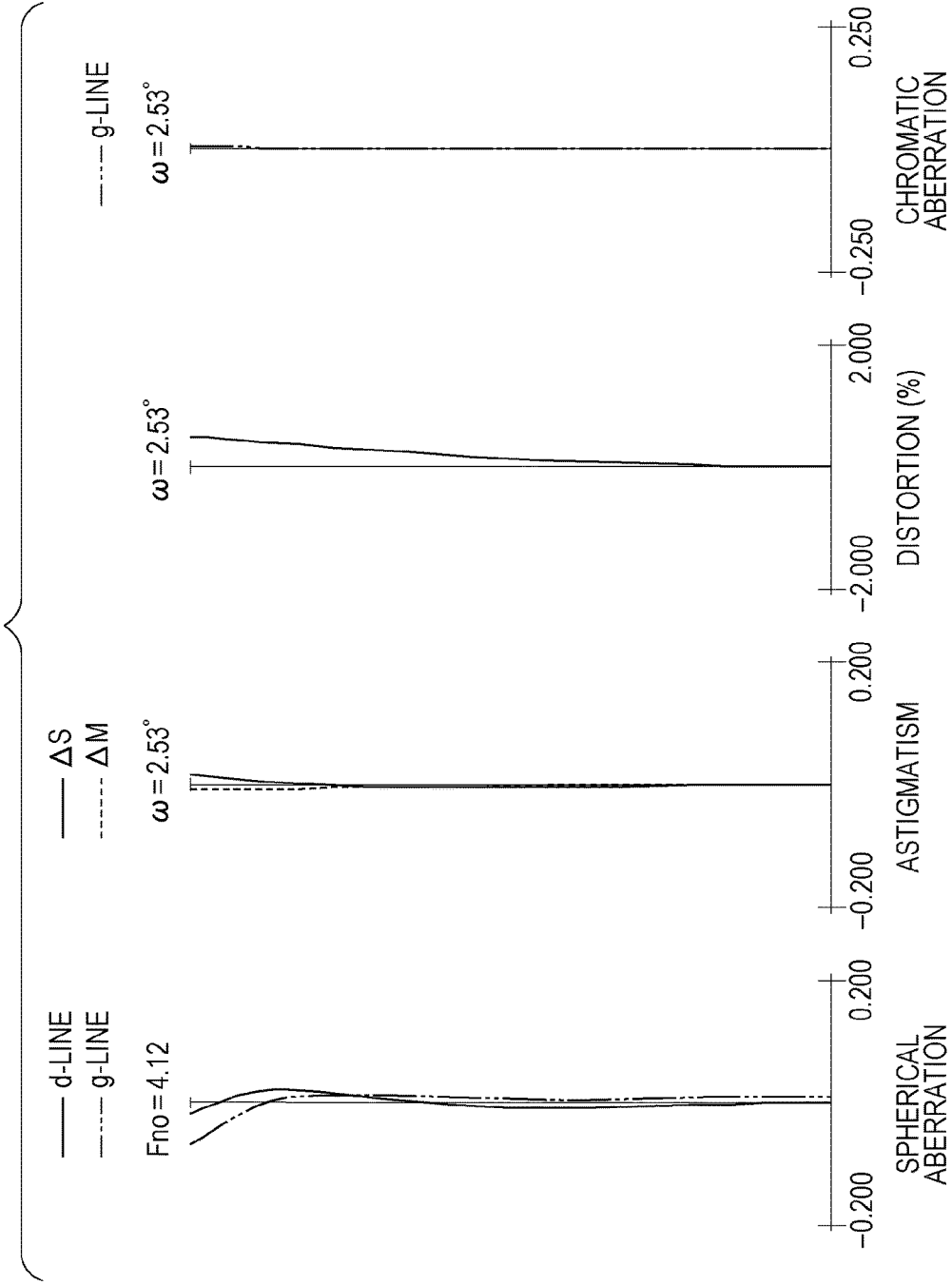
FIG. 12 illustrates aberrations of the optical system according to the sixth embodiment when the optical system is focused at infinity.
Figure 13:
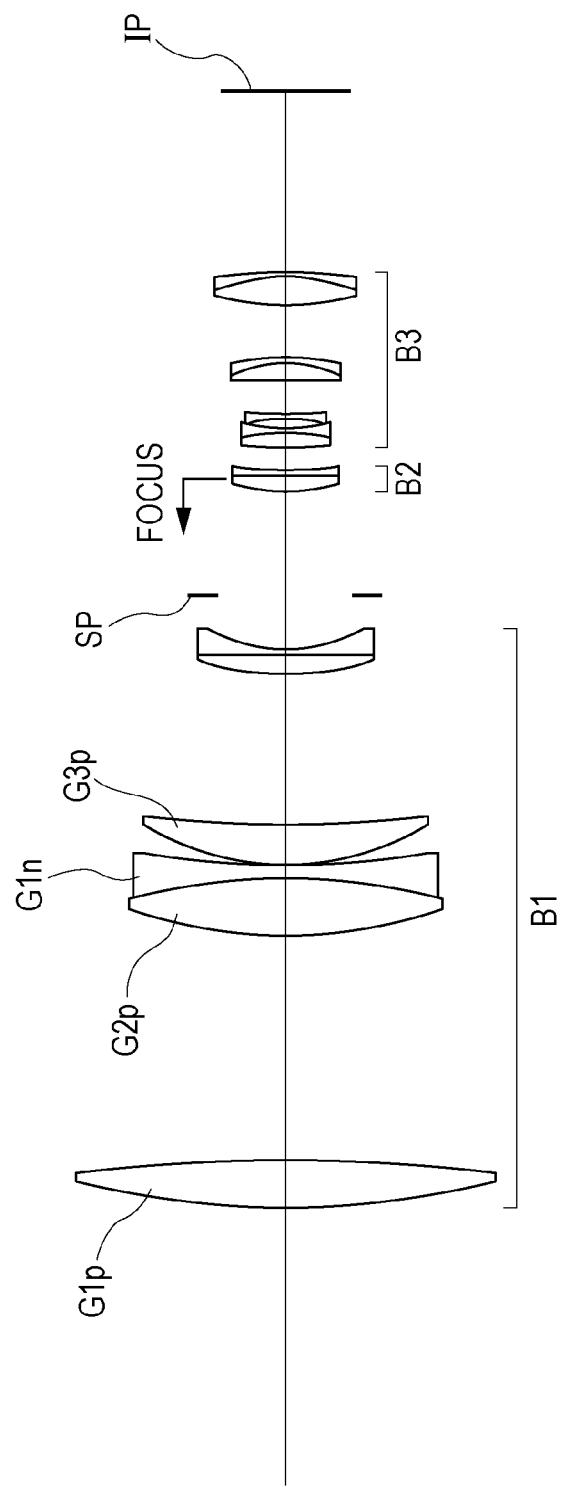
FIG. 13 is a sectional view of lenses of an optical system according to a seventh embodiment.
Figure 14:
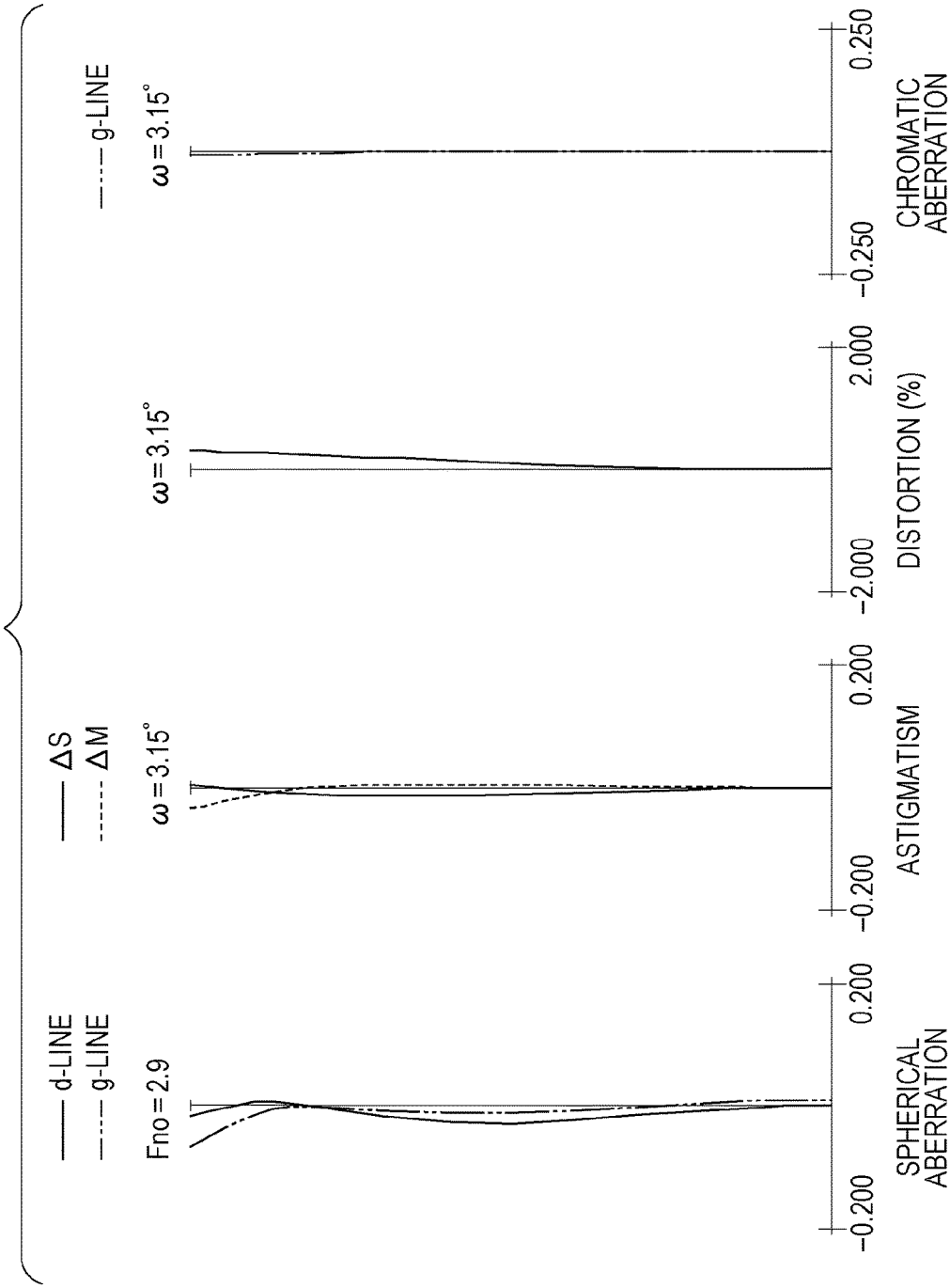
FIG. 14 illustrates aberrations of the optical system according to the seventh embodiment when the optical system is focused at infinity.
Figure 15:
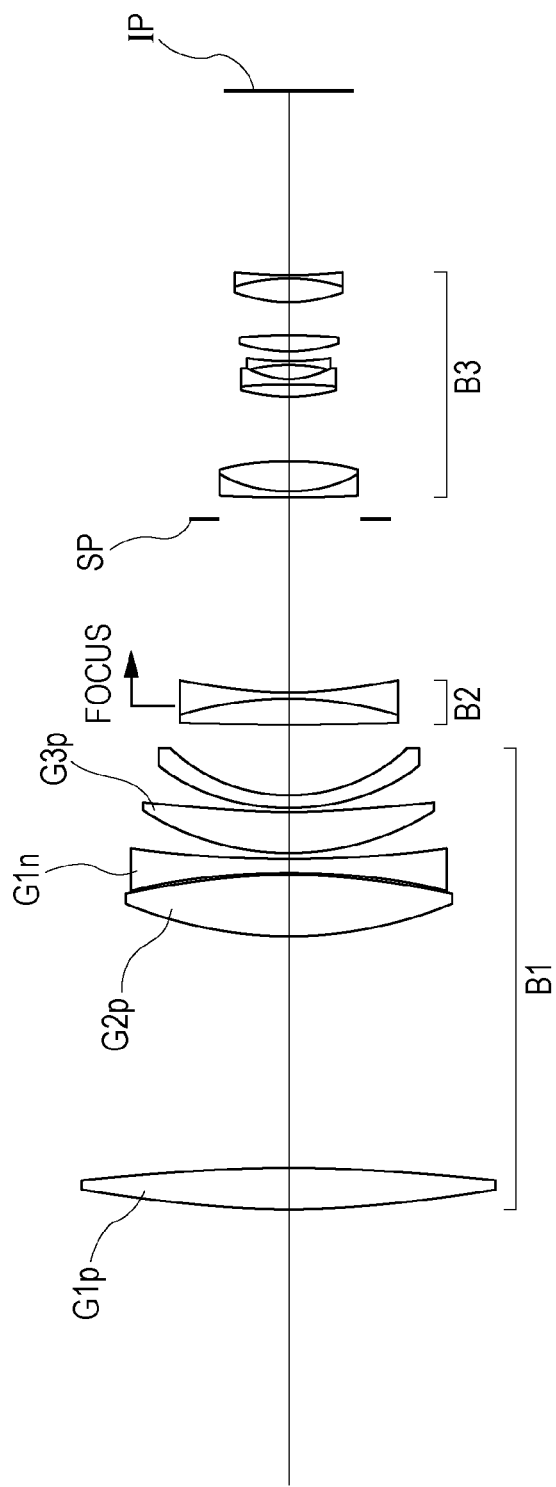
FIG. 15 is a sectional view of lenses of an optical system according to an eighth embodiment.
Figure 16:
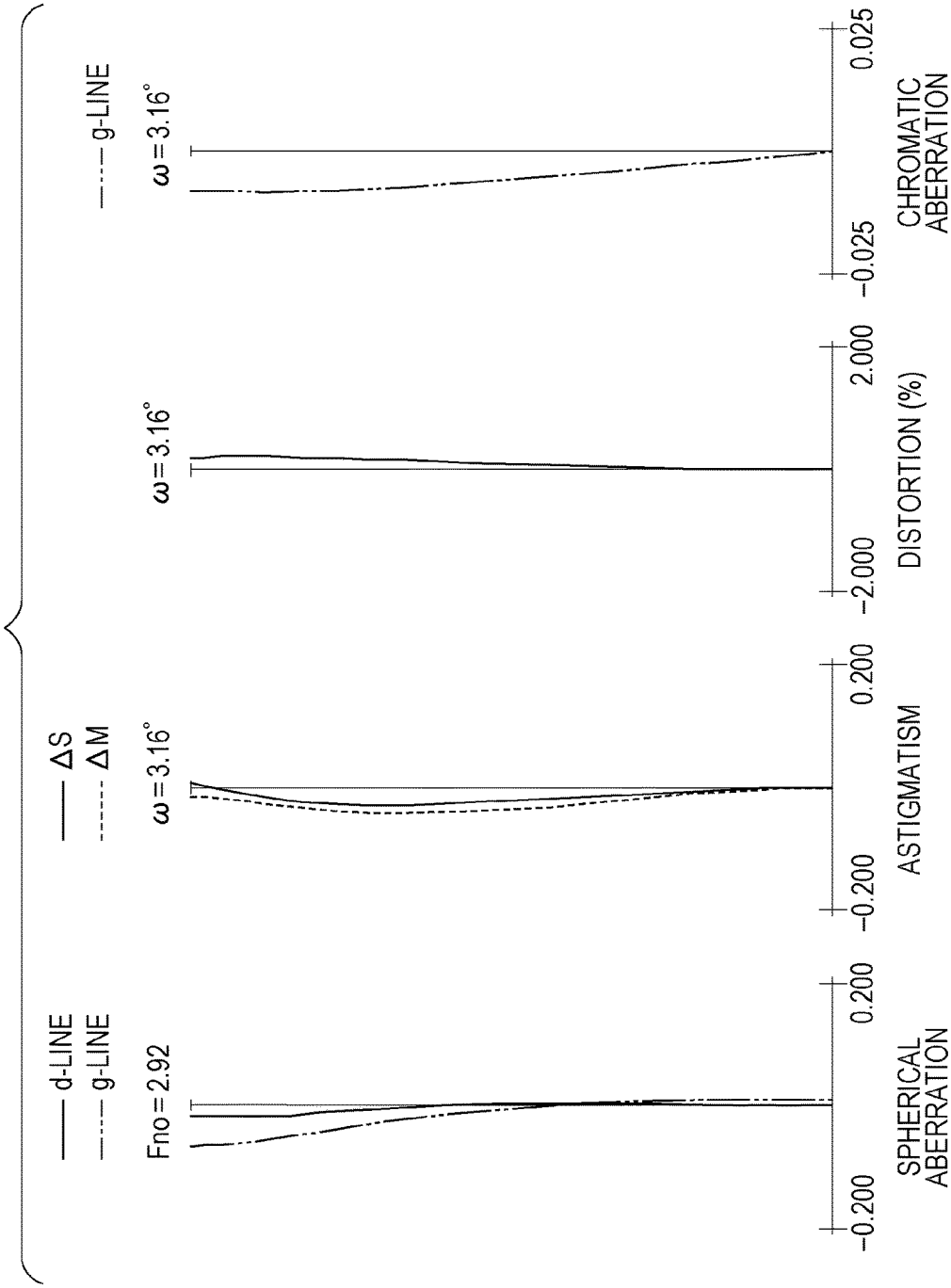
FIG. 16 illustrates aberrations of the optical system according to the eighth embodiment when the optical system is focused at infinity.
Figure 17:
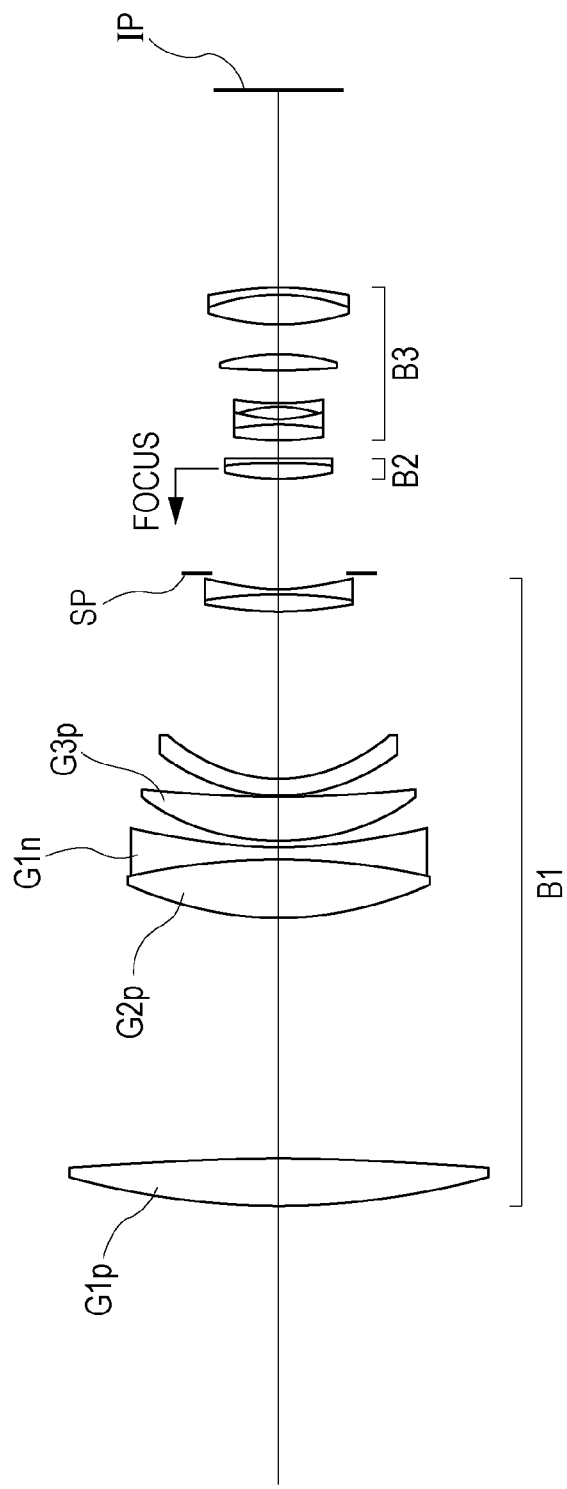
FIG. 17 is a sectional view of lenses of an optical system according to a ninth embodiment.
Figure 18:
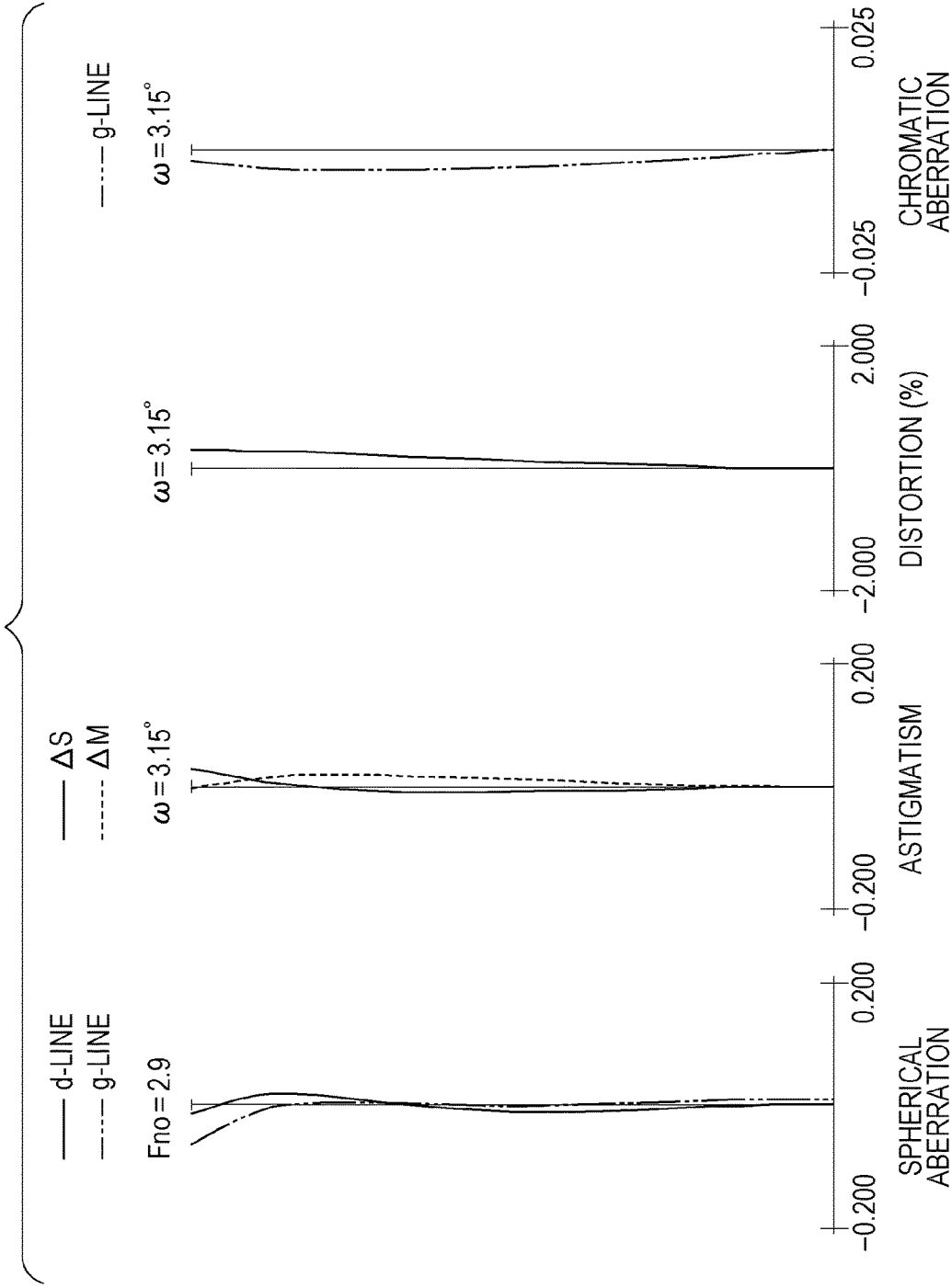
FIG. 18 illustrates aberrations of the optical system according to the ninth embodiment when the optical system is focused at infinity.
Figure 19:
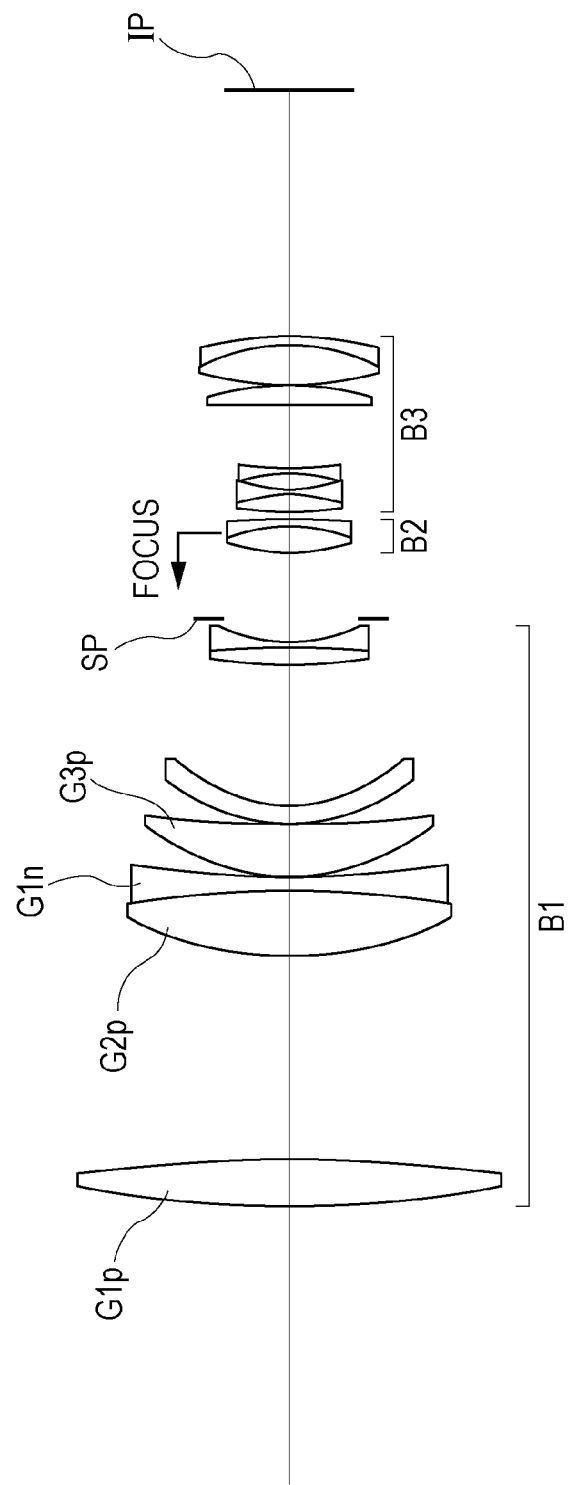
FIG. 19 is a sectional view of lenses of an optical system according to a tenth embodiment.
Figure 20:
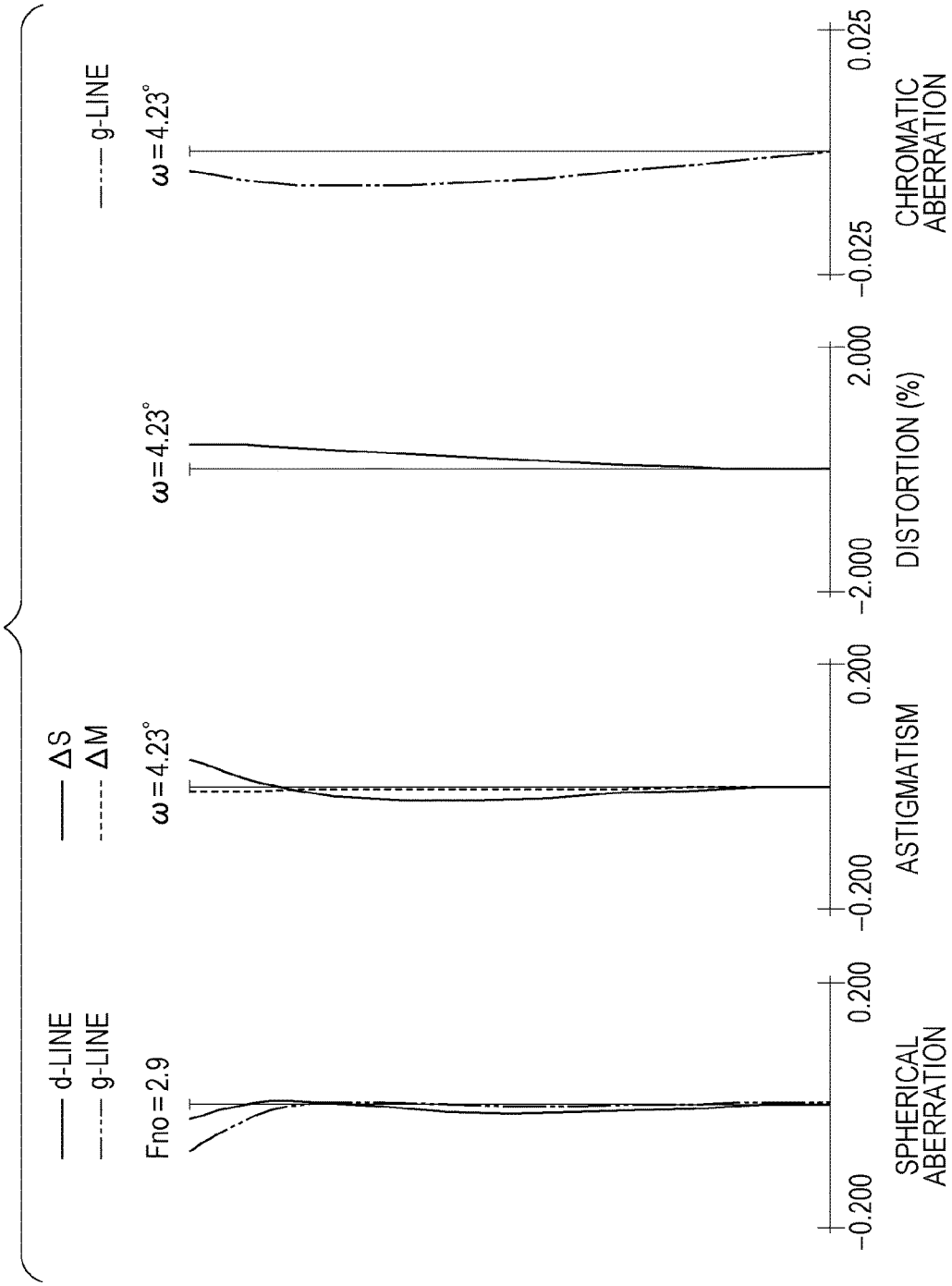
FIG. 20 illustrates aberrations of the optical system according to the tenth embodiment when the optical system is focused at infinity.
Figure 21:
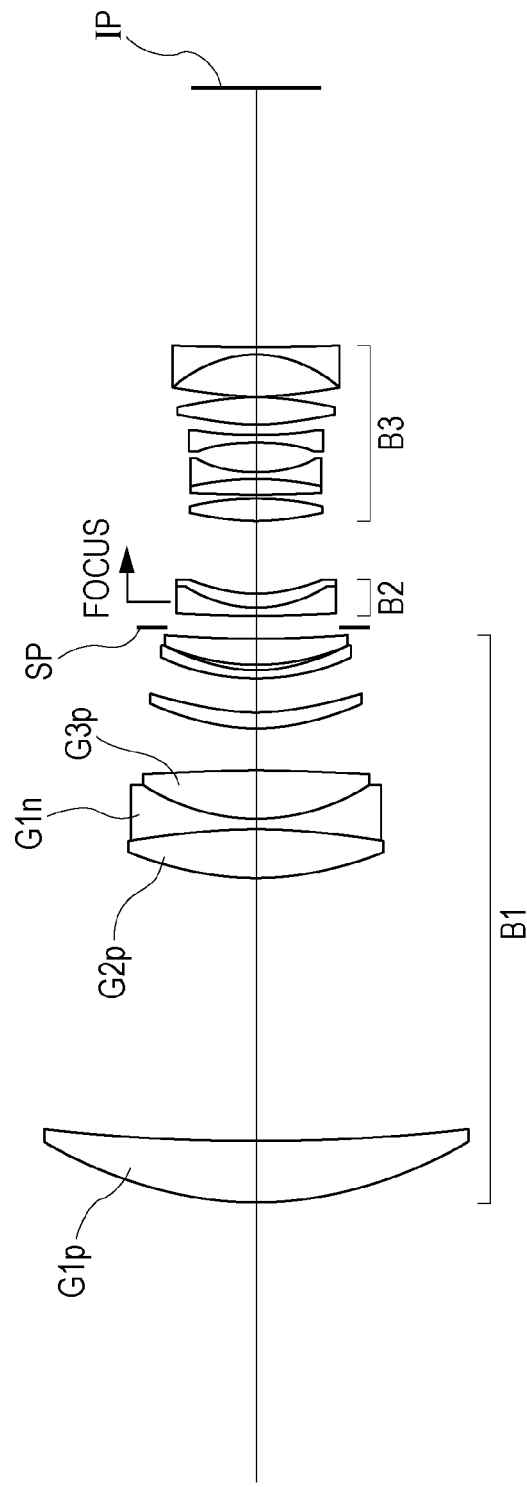
FIG. 21 is a sectional view of lenses of an optical system according to an eleventh embodiment.
Figure 22:
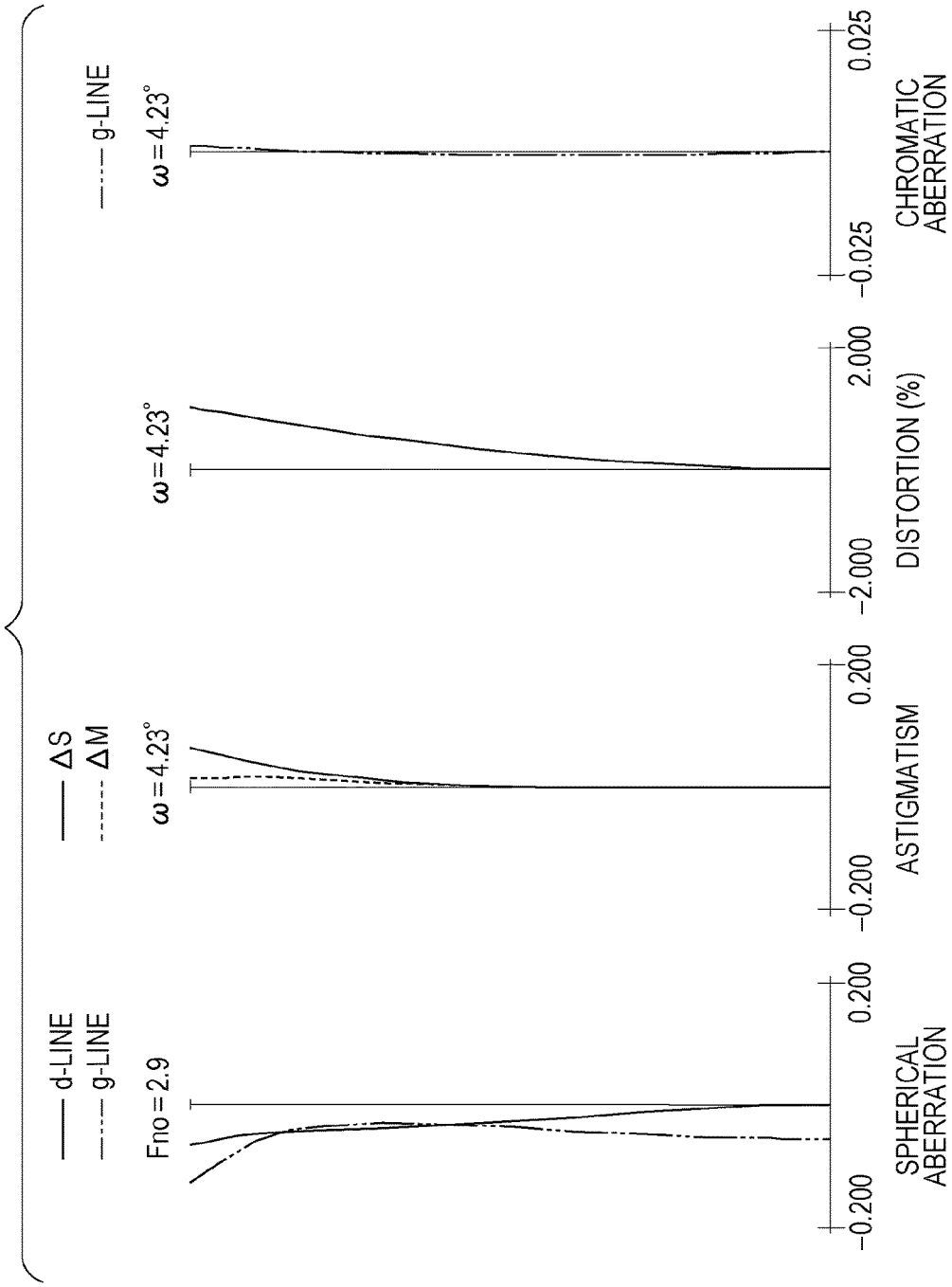
FIG. 22 illustrates aberrations of the optical system according to the eleventh embodiment when the optical system is focused at infinity.
Figure 23:
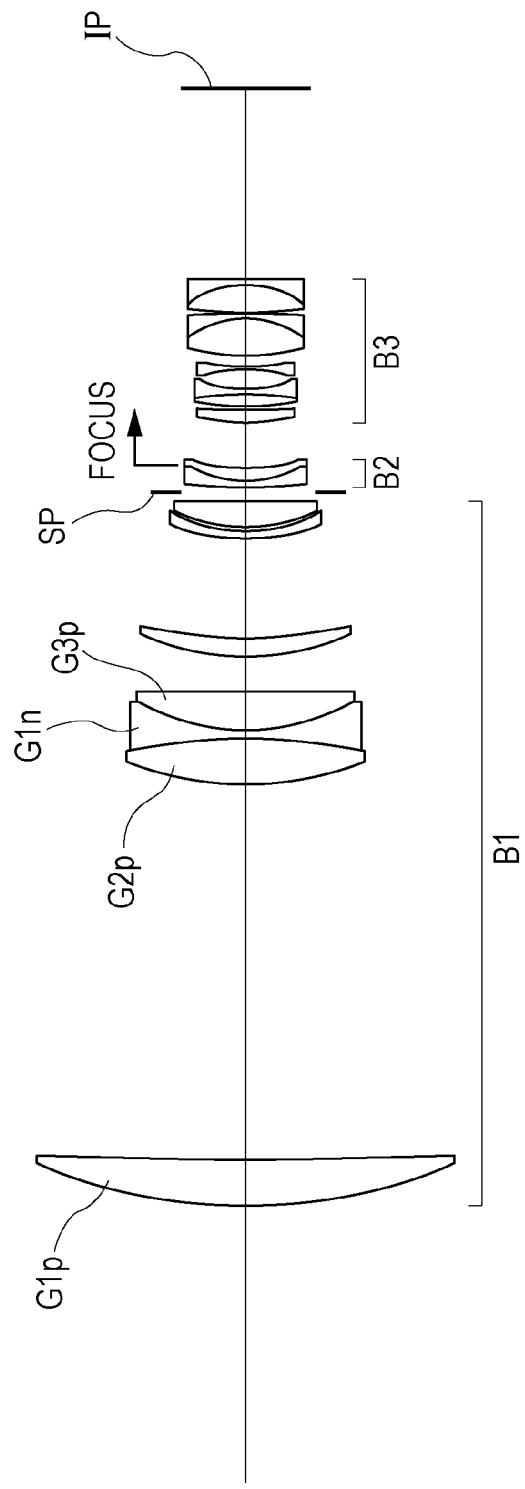
FIG. 23 is a sectional view of lenses of an optical system according to a twelfth embodiment.
Figure 24:
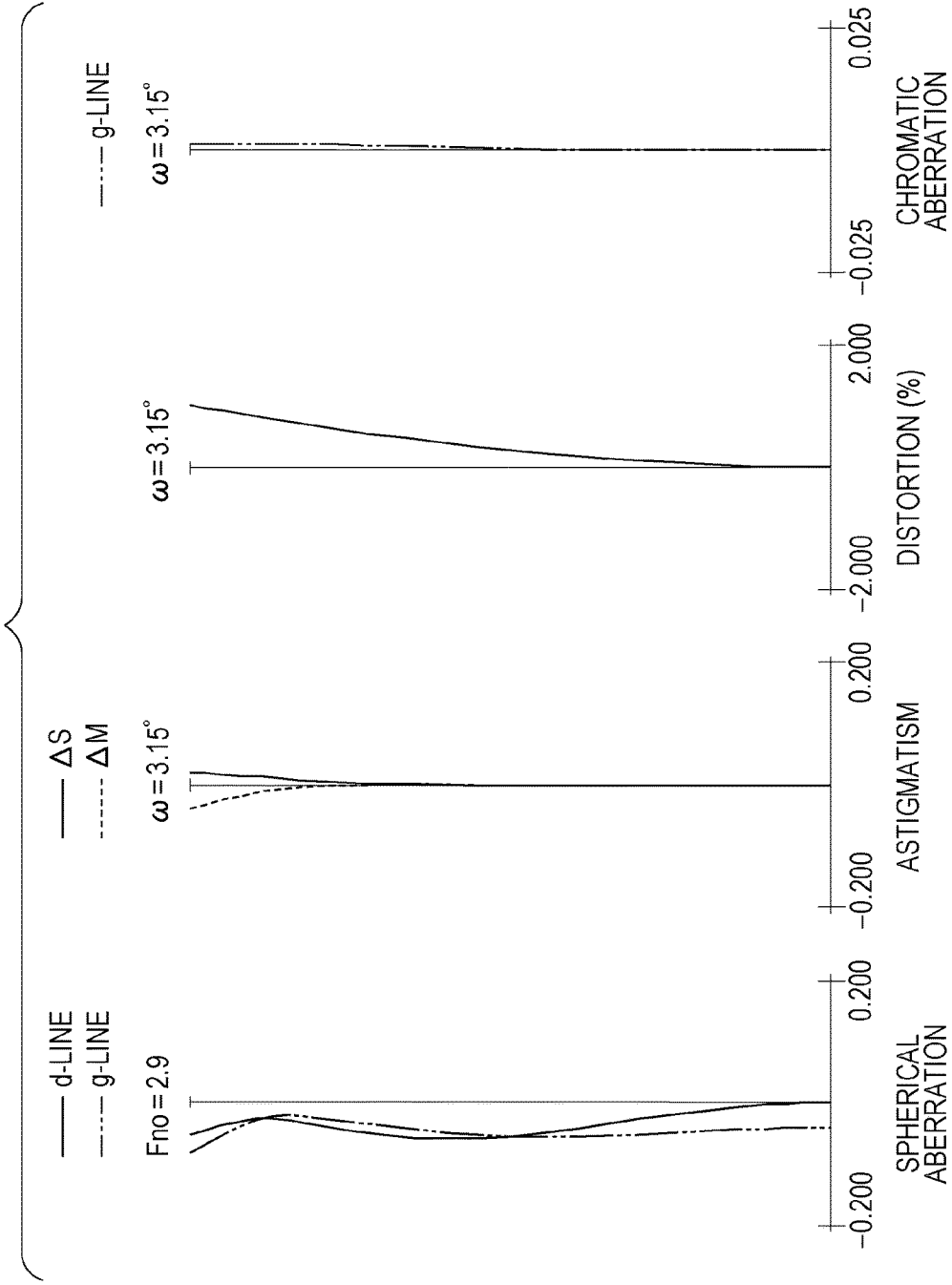
FIG. 24 illustrates aberrations of the optical system according to the twelfth embodiment when the optical system is focused at infinity.
Figure 25:
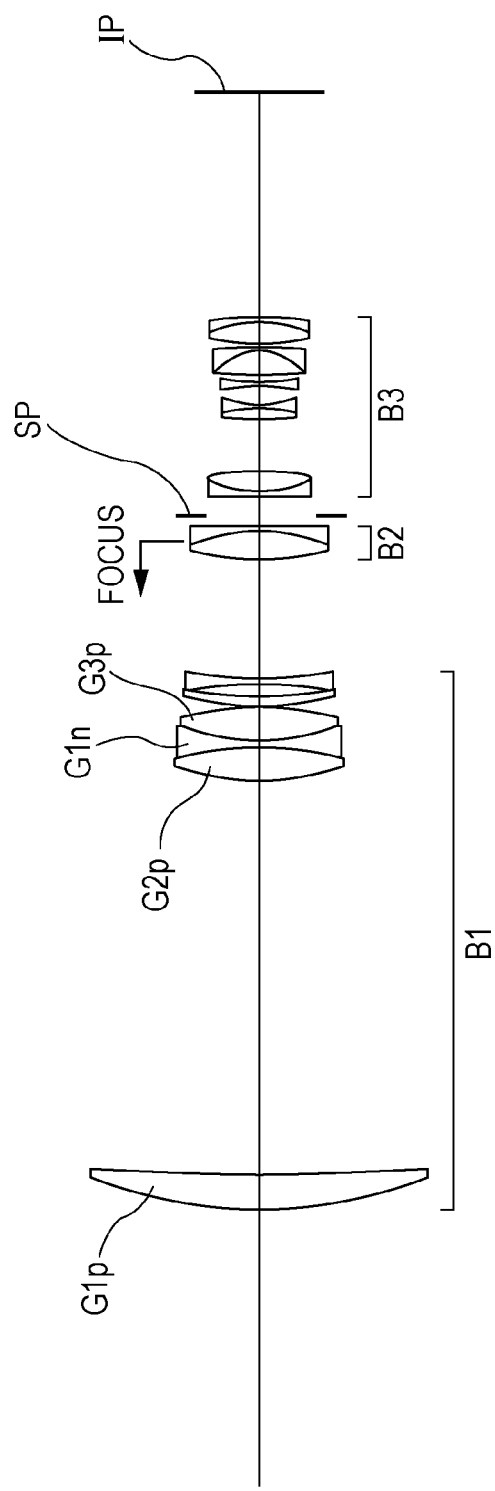
FIG. 25 is a sectional view of lenses of an optical system according to a thirteenth embodiment.
Figure 26:
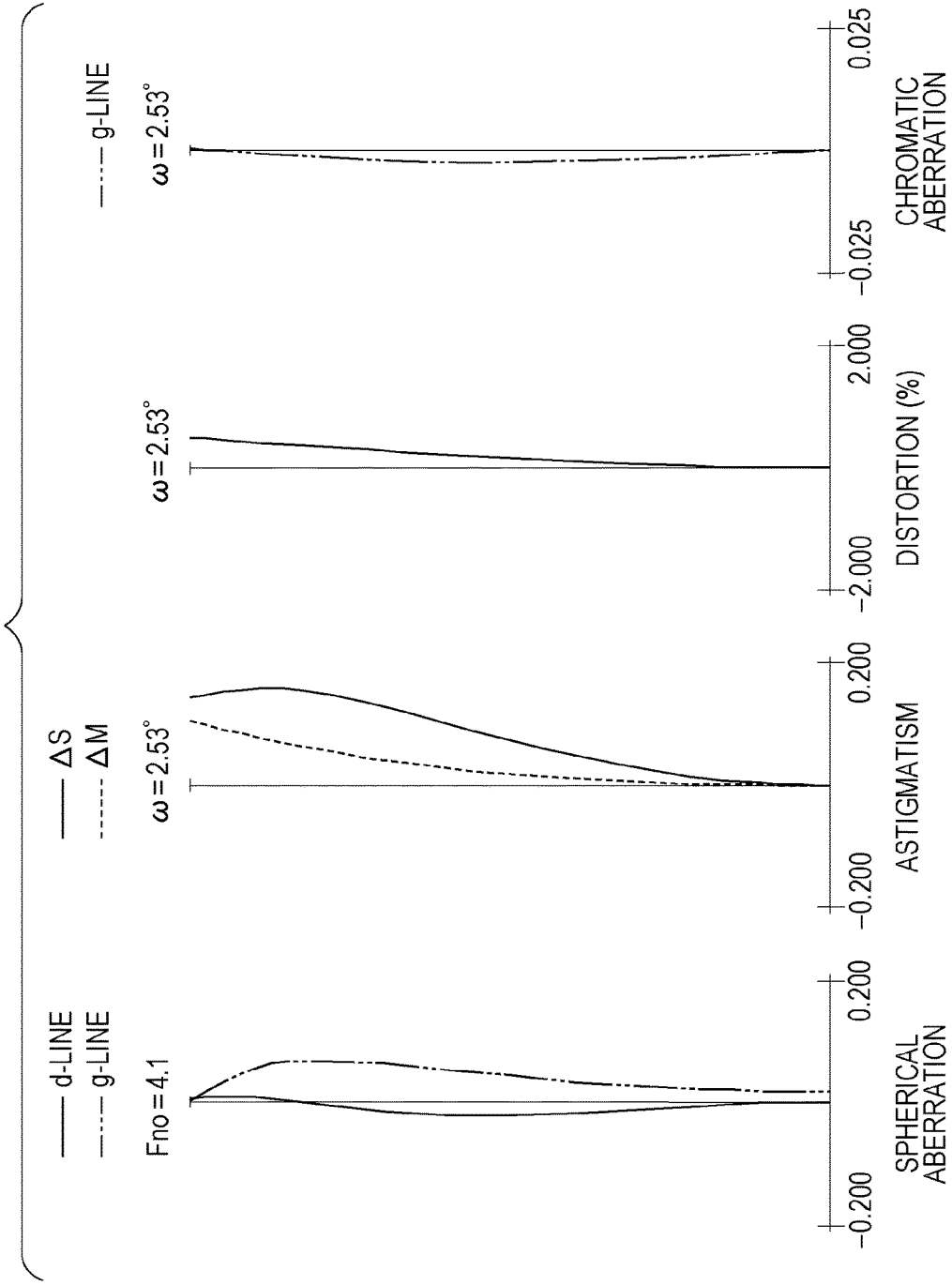
FIG. 26 illustrates aberrations of the optical system according to the thirteenth embodiment when the optical system is focused at infinity.
Figure 27:
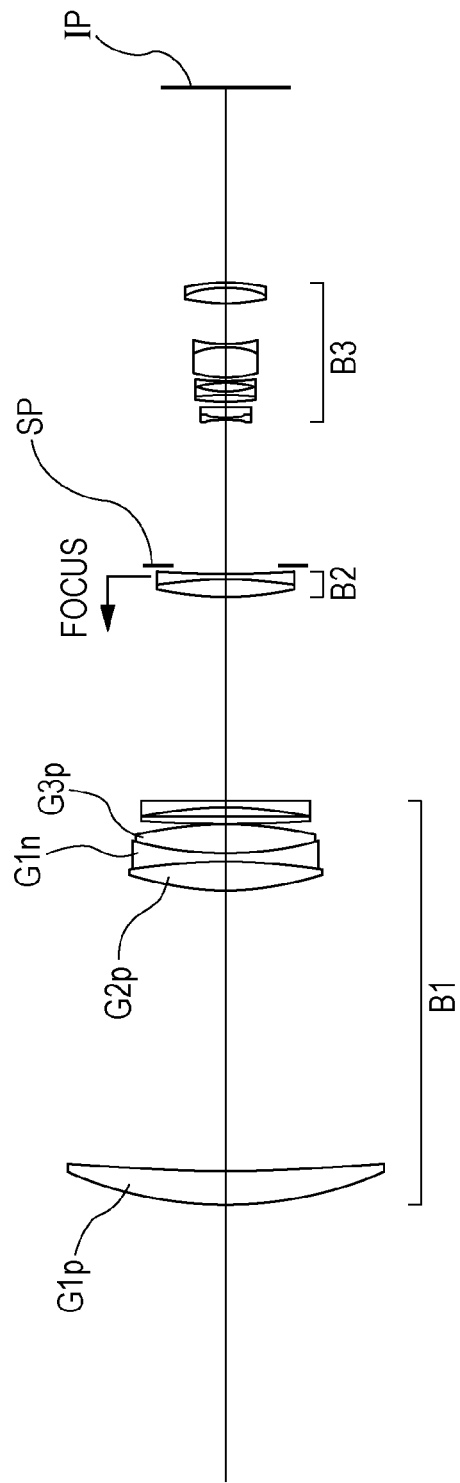
FIG. 27 is a sectional view of lenses of an optical system according to a fourteenth embodiment.
Figure 28:
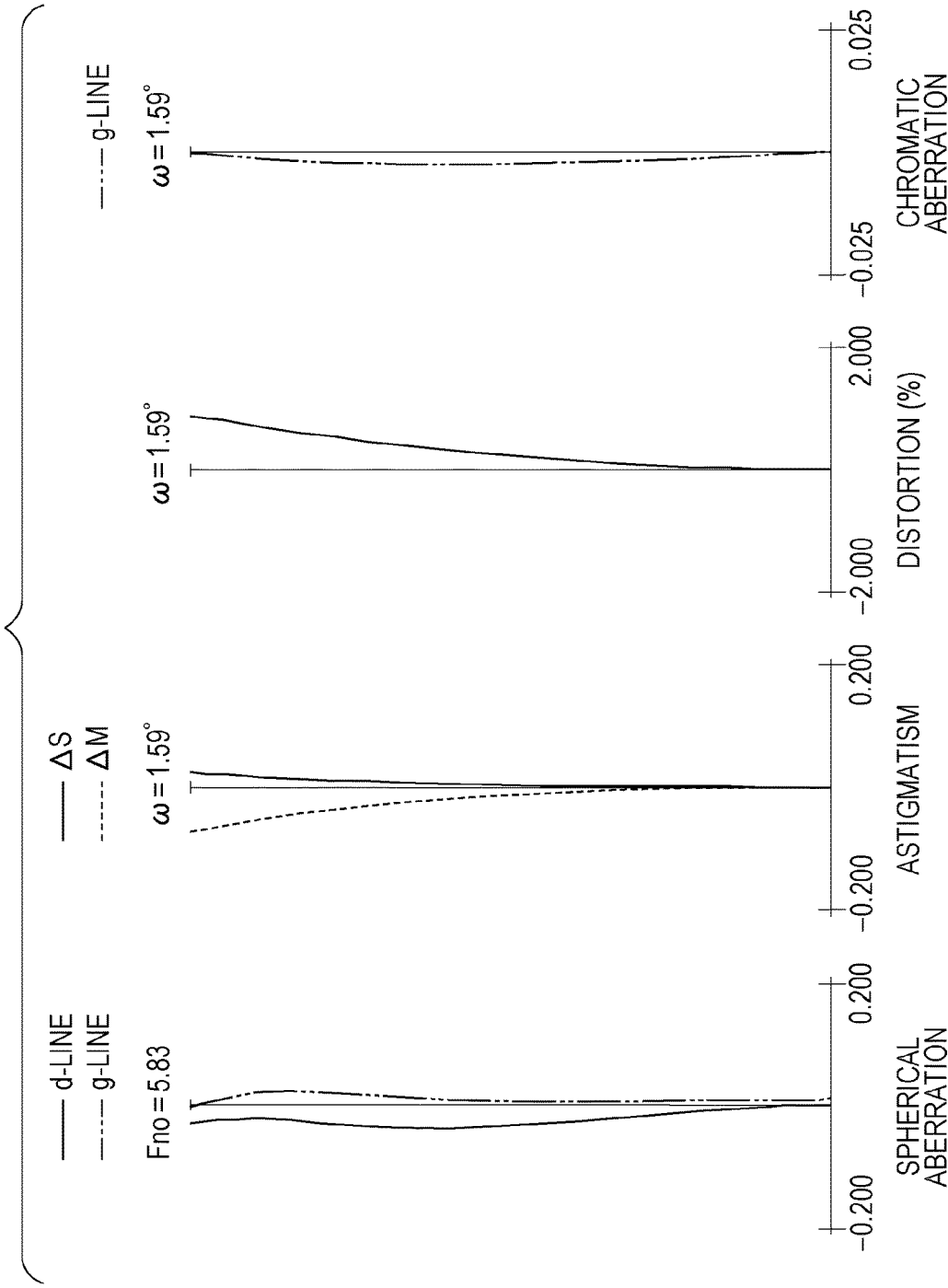
FIG. 28 illustrates aberrations of the optical system according to the fourteenth embodiment when the optical system is focused at infinity.
Figure 29:
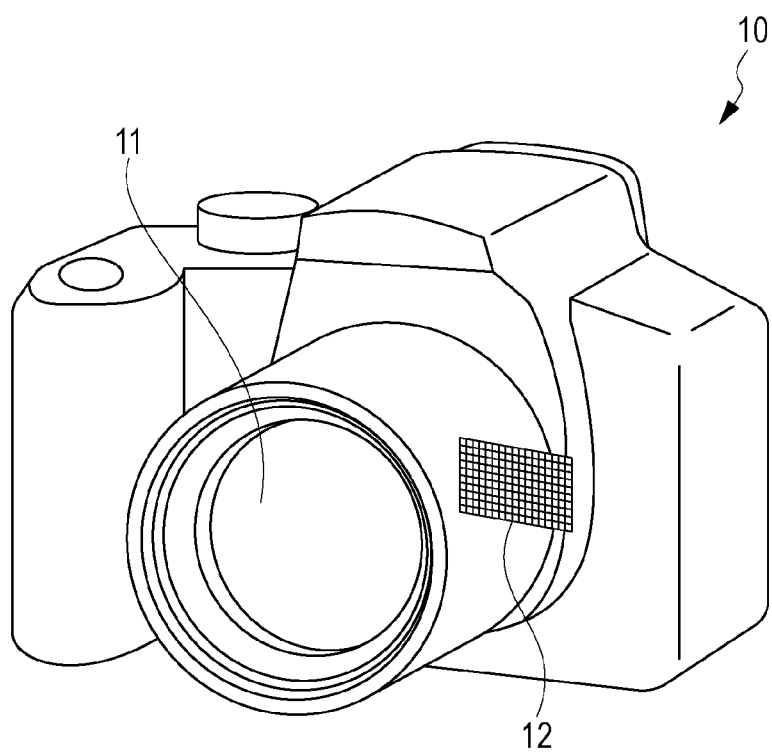
FIG. 29 is a schematic view of a main portion of an image pickup apparatus.

FIG. 29 is a schematic view of an image pickup apparatus according to an embodiment of the present invention. The optical system according to each embodiment is an image taking lens system that is used in an image pickup apparatus, such as a video camera, a digital camera, a silver-halide film camera, or a television camera. In the sectional views of lenses, the left side is the object side (front) and the right side is the image side (rear). In the sectional views of the lenses, Bi denotes an i-th lens unit, where i denotes the order of the lens unit from the object side to the image side.

In each embodiment, SP denotes an aperture stop. In the second embodiment, the fourth embodiment, the eighth embodiment, the thirteenth embodiment, and the fourteenth embodiment, the aperture stop SP is disposed between a second lens unit B2 and a third lens unit B3. In the third embodiment, the aperture stop SP is disposed in a first lens unit B1. In the first embodiment, the fifth embodiment, the sixth embodiment, the seventh embodiment, the ninth embodiment, the tenth embodiment, the eleventh embodiment, and the twelfth embodiment, the aperture stop SP is disposed between the first lens unit B1 and the second lens unit B2.

The optical systems according to the first embodiment, the eleventh embodiment, and the twelfth embodiment each include a first lens unit having a positive refractive power, a second lens unit having a negative refractive power, and a third lens unit having a positive refractive power, which are disposed in that order from the object side to the image side. The optical systems according to the second embodiment, the fourth embodiment, and the eighth embodiment each include a first lens unit having a positive refractive power, a second lens unit having a negative refractive power, and a third lens unit having a negative refractive power, which are disposed in that order from the object side to the image side. The optical systems according to the third embodiment, the fifth embodiment, the sixth embodiment, the tenth embodiment, the thirteenth embodiment, and the fourteenth embodiment each include a first lens unit having a positive refractive power, a second lens unit having a positive refractive power, and a third lens unit having a negative refractive power, which are disposed in that order from the object side to the image side. The optical systems according to the seventh and ninth embodiments each include a first lens unit having a positive refractive power, a second lens unit having a positive refractive power, and a third lens unit having a positive refractive power.

Symbol IP denotes an image plane. When an optical system is used as an image pickup optical system of a video camera or a digital camera, the image plane IP corresponds to a solid-state image pickup element (photoelectric conversion element), such as a CCD sensor and a CMOS sensor. When the optical system according to each embodiment is used as an image pickup optical system of a silver-halide film camera, the image plane corresponds to a film plane.

In the diagrams illustrating spherical aberration, Fno denotes an F-number, and indicates spherical aberration with respect to a d-line (wavelength: 587.6 nm) and a g-line (wavelength: 435.8 nm). In the diagrams illustrating astigmatism, ΔS denotes the amount of astigmatism in a sagittal image plane, and ΔM denotes the amount of astigmatism in a meridional image plane. Distortion aberration is indicated with respect to a d-line. In the diagrams illustrating chromatic aberration, chromatic aberration at a g-line is illustrated. ω denotes an image-pickup half angle of view.

In each embodiment, as indicated by an arrow in each of the sectional views of the lenses, in focusing from a point at infinity up to a close distance, the second lens unit B2 moves to change the interval between adjacent lens units. In the optical system according to each of the embodiments, the second lens unit B2 corresponds to a focusing unit. In the first embodiment, the second embodiment, the fourth embodiment, the eighth embodiment, the eleventh embodiment, and the twelfth embodiment, in focusing from a point at infinity to a close distance, the second lens unit B2 is moved to the image side. In the third embodiment, the fifth to seventh embodiments, the ninth embodiment, the tenth embodiment, the thirteenth embodiment, and the fourteenth embodiment, in focusing from a point at infinity to a close distance, the second lens unit B2 is moved to the object side.

In the optical system according to each embodiment, some of the lenses of the optical system may constitute an image stabilizing unit, in which case, by moving the image stabilizing unit in a direction including a component in a direction perpendicular to an optical axis, a focus position can be changed. This makes it possible to correct image blurring. Any of the first lens unit B1, the second lens unit B2, and the third lens unit B3 may serve as the image stabilizing unit; or some of the lenses of a particular lens unit may serve as the image stabilizing unit.

In the optical system according to each embodiment, lenses of the first lens unit B1 are arranged such that the distance along an optical axis between a positive lens G1p that is disposed closest to the object side among the lenses included in the first lens unit B1 and a lens that is disposed adjacent to the image side of the positive lens G1p is large. This makes it possible to effectively reduce the effective diameter of the lens that is disposed closer to the image side than the positive lens G1p is.

In addition, a positive lens G2p that is included in the first lens unit B1 and that is disposed closer to the image side than the positive lens G1p is and a positive lens G3p that is included in the first lens unit B1 and that is disposed closer to the image side than the positive lens G2p is are made of a material having low dispersion and anomalous dispersion.

As a result, it is possible to reduce the weight of the optical system and to correct chromatic aberration.

Here, as parameters related to correcting chromatic aberration in the optical system, an Abbe number νd and a partial dispersion ratio θgF are known. When the refractive indices of a material with respect to a g-line (wavelength: 435.8 nm), an F-line (486.1 nm), a C-line (wavelength: 656.3 nm), and a d-line (wavelength: 587.6 nm) are Ng, NF, NC, and Nd, the Abbe number νd and the partial dispersion ratio θgF are expressed as follows:

$$\nu d = (Nd-1)/(NF-NC)$$

$$\theta gF = (Ng-NF)/(NF-NC)$$

In general, by using a material having low dispersion as the material of the positive lenses in the lens unit having a positive refractive power as a whole, it is possible to reduce the amount of generation of first-order chromatic aberration. In addition, by using a material having anomalous dispersion as the material of the positive lenses in the lens unit having a positive refractive power as a whole, it is possible to properly correct second-order chromatic aberration of magnification.

Here, the anomalous dispersion of materials used for the lenses is described. When $$\Delta\theta gF = \theta gF - (0.6438 - 0.001682 \times \nu d) \quad (A),$$

the numerical value of Formula (A) becomes a value close to zero for many materials. As the numerical value of Formula (A) moves away from zero, the material becomes a material having higher anomalous dispersion.

The optical system according to each embodiment satisfies the following conditional expressions:

$$LD/f < 1.0 \quad (1)$$

$$0.170 < D12/LD < 0.500 \quad (2)$$

$$\nu dG2p > 73.0 \quad (3)$$

$$\nu dG3p > 73.0 \quad (4)$$

Here, the focal length of the entire optical system is f, and the distance along an optical axis from a lens surface of the first lens unit B1 that is closest to the object side to the image plane (hereunder referred to as the "overall lens length") is LD. The distance between the positive lens G1p that is disposed closest to the object side among the lenses included in the first lens unit B1 and a lens G2 that is disposed adjacent to the image side of the positive lens G1p is D12. The Abbe number of the material of the positive lens G2p that is included in the first lens unit B1 and that is disposed closer to the image side than the positive lens G1p is is νdG2p, and the Abbe number of the material of the positive lens G3p that is included in the first lens unit B1 and that is disposed closer to the image side than the positive lens G2p is is νdG3p.

Conditional Expression (1) shows that the distance LD along the optical axis from the lens surface of the first lens unit B1 closest to the object side to the image plane is less than the focal length f of the entire optical system. In general, the optical system installed in a telephoto lens and whose overall lens length is small has a focal length that is larger than the overall lens length. When LD/f becomes greater than the upper limit of Conditional Expression (1) and the overall lens length is increased, the optical system becomes large in an optical axis direction. Therefore, this is not desirable.

Conditional Expression (2) is a conditional expression that prescribes the ratio between the overall lens length LD and the distance D12 along an optical axis between the positive lens G1p and the lens G2 that is disposed adjacent to the image side of the positive lens G1p. Although, in the optical system according to each embodiment, the lens G2 corresponds to the positive lens G2p, the lens G2 may be a lens that differs from the positive lens G2p. However, in order to effectively correct chromatic aberration while making light the optical system, it is desirable to dispose the positive lens G2p adjacent to the positive lens G1p.

When D12/LD becomes less than the lower limit of Conditional Expression (2) and the distance D12 along the optical axis between the positive lens G1p and the lens G2 becomes small, the effective diameter of the lens G2 becomes too large, as a result of which the weight of the optical system is increased. Therefore, this is not desirable. When D12/LD becomes greater than the upper limit of Conditional Expression (2) and the distance D12 along the optical axis between the positive lens G1p and the lens G2 becomes large, it becomes difficult to correct spherical aberration and chromatic aberration that occur at the positive lens G1p by a lens that is disposed closer to the image side than the positive lens G1p is. Therefore, this is not desirable.

Conditional Expressions (3) and (4) are conditional expressions that prescribe the Abbe number νdG2p of the material of the positive lens G2p and the Abbe number νdG3p of the material of the positive lens G3p. When νdG2p becomes less than the lower limit of Conditional Expression (3) and becomes small, chromatic aberration occurs frequently at the positive lens G2p. Therefore, this is not desirable. Similarly, when νdG3p becomes less than the lower limit of Conditional Expression (4) and becomes small, chromatic aberration occurs frequently at the positive lens G3p. Therefore, this is not desirable.

In each of the embodiments, as described above, each element is properly set so as to satisfy Conditional Expressions (1) to (4). This makes it possible to provide a light optical system whose aberrations, such as chromatic aberrations, are properly corrected.

In each of the embodiments, the numerical ranges of Conditional Expressions (1) to (4) may be desirably set as follows:

$$LD/f < 0.98 \quad (1a)$$

$$0.175 < D12/LD < 0.450 \quad (2a)$$

$$\nu dG2p > 80.0 \quad (3a)$$

$$\nu dG3p > 80.0 \quad (4a)$$

Further, the numerical ranges of Conditional Expressions (1) to (4) may be more desirably set as follows:

$$LD/f < 0.96 \quad (1b)$$

$$0.178 < D12/LD < 0.400 \quad (2b)$$

$$\nu dG2p > 90.0 \quad (3b)$$

$$\nu dG3p > 90.0 \quad (4b)$$

As in the optical systems according to the first to ninth embodiments and the optical systems according to the eleventh to fourteenth embodiments, when D12/LD is 0.200 or greater, it is possible to further reduce the weight of the optical system.

Further, in each embodiment, it is desirable that one or more of the following conditional expressions be satisfied:

$$0.020<\theta gF\_G2p-(0.6438-0.001682\times vdG2p)<0.100 \quad (5)$$

$$0.020<\theta gF\_G3p-(0.6438-0.001682\times vdG3p)<0.100 \quad (6)$$

$$LG2p/(LD-D12)>0.80 \quad (7)$$

$$LG3p/(LD-D12)>0.70 \quad (8)$$

$$\rho G1p<3.0 \ [g/cm^3] \quad (9)$$

$$1.50<fG1p/fG2p<5.00 \quad (10)$$

$$1.30<fG1p/fG3p<5.00 \quad (11)$$

$$1.80<|fG1p/fG1n|<10.00 \quad (12)$$

$$20.0<vdG1n<40.0 \quad (13)$$

Here, the partial dispersion ratio of the material of the positive lens G2p is $\theta gF\_G2p$, the partial dispersion ratio of the material of the positive lens G3p is $\theta gF\_G3p$, and the distance along the optical axis from an object-side lens surface of the positive lens G2p to the image plane is LG2p. The distance along the optical axis from an object-side lens surface of the positive lens G3p to the image plane is LG3p, the specific gravity of the material of the positive lens G1p is $\rho G1p$, the focal length of the positive lens G1p is fG1p, the focal length of the positive lens G2p is fG2p, and the focal length of the positive lens G3p is fG3p. The focal length of a negative lens G1n that is disposed closest to the object side among negative lenses included in the first lens unit B1 is fG1n, and the Abbe number of the material of the negative lens G1n is vdG1n.

Conditional Expression (5) is a conditional expression that prescribes the anomalous dispersion of the material of the positive lens G2p. By forming the positive lens G2p out of a material having anomalous dispersion, it is possible to correct second-order chromatic aberration of magnification more effectively. A material having a numerical value that is greater than the upper limit of Conditional Expression (5) is of little practical use as an image taking optical system. When a material having a numerical value that is less than the lower limit of Conditional Expression (5) is used as the material of the positive lens G2p, it is difficult to sufficiently correct second-order chromatic aberration of magnification. Therefore, this is not desirable.

Conditional Expression (6) is a conditional expression that prescribes the anomalous dispersion of the material of the positive lens G3p. By forming the positive lens G3p out of a material having anomalous dispersion, it is possible to correct second-order chromatic aberration of magnification more effectively. A material having a numerical value that is greater than the upper limit of Conditional Expression (6) is of little practical use as an image taking optical system. When a material having a numerical value that is less than the lower limit of Conditional Expression (6) is used as the material of the positive lens G3p, it is difficult to sufficiently correct second-order chromatic aberration of magnification. Therefore, this is not desirable.

Conditional Expression (7) is a conditional expression that prescribes the position of the positive lens G2p in the entire optical system. When (LD−D12) becomes less than the lower limit of Conditional Expression (7), the distance between the positive lens G1p and the positive lens G2p becomes too large, as a result of which the heights of an on-axis ray and an off-axis ray that are incident upon the positive lens G2p become too low. As a result, it becomes difficult to properly correct second-order chromatic aberration of magnification and axial chromatic aberration in the positive lens G2p. Therefore, this is not desirable.

Conditional Expression (8) is a conditional expression that prescribes the position of the positive lens G3p in the entire optical system. When (LD−D12) becomes less than the lower limit of Conditional Expression (8), the distance between the positive lens G1p and the positive lens G3p becomes too large, as a result of which the heights of an on-axis ray and an off-axis ray that are incident upon the positive lens G3p become too low. As a result, it becomes difficult to properly correct second-order chromatic aberration of magnification and axial chromatic aberration in the positive lens G3p. Therefore, this is not desirable.

Conditional Expression (9) is a conditional expression that prescribes the specific gravity $\rho G1p$ of the material of the positive lens G1p. When $\rho G1p$ becomes greater than the upper limit of Conditional Expression (9) and the specific gravity $\rho G1p$ of the material of the positive lens G1p becomes large, the positive lens G1p becomes heavy, as a result of which it becomes difficult to reduce the weight of the optical system. Therefore, this is not desirable.

Conditional Expression (10) is a conditional expression that prescribes the ratio between the focal length fG1p of the positive lens G1p and the focal length fG2p of the positive lens G2p. When fG1p/fG2p becomes less than the lower limit of Conditional Expression (10) and the focal length fG1p of the positive lens G1p becomes small, the refractive power of the positive lens G1p becomes too strong, as a result of which axial chromatic aberration frequently occurs at the positive lens G1p. Therefore, this is not desirable. In order to correct axial chromatic aberration that occurs at the positive lens G1p by a negative lens included in the first lens unit B1, it is necessary to increase the number of negative lenses, as a result of which the weight of the optical system is increased. Therefore, this is not desirable.

When fG1p/fG2p becomes greater than the upper limit of Conditional Expression (10) and the focal length fG1p of the positive lens G1p becomes large, the refractive power of the positive lens G1p becomes too weak. As a result, light at the positive lens G1p cannot be sufficiently converged, and the effective diameter of a lens disposed on the image side of the positive lens G1p becomes large, thereby increasing the weight of the optical system. Therefore, this is not desirable.

Conditional Expression (11) is a conditional expression that prescribes the ratio between the focal length fG1p of the positive lens G1p and the focal length fG3p of the positive lens G3p. When fG1p/fG3p becomes less than the lower limit of Conditional Expression (11) and the focal length fG1p of the positive lens G1p becomes small, the refractive power of the positive lens G1p becomes too strong, as a result of which axial chromatic aberration frequently occurs at the positive lens G1p. Therefore, this is not desirable. In order to correct axial chromatic aberration that occurs at the positive lens G1p by a negative lens included in the first lens unit B1, it is necessary to increase the number of negative lenses, as a result of which the weight of the optical system is increased. Therefore, this is not desirable.

When fG1p/fG3p becomes greater than the upper limit of Conditional Expression (11) and the focal length fG1p of the positive lens G1p becomes large, the refractive power of the positive lens G1p becomes too weak. As a result, light at the positive lens G1p cannot be sufficiently converged, and the effective diameter of a lens disposed on the image side of the positive lens G1p becomes large, thereby increasing the weight of the optical system. Therefore, this is not desirable.

Conditional Expression (12) is a conditional expression that prescribes the ratio between the focal length fG1p of the positive lens G1p and the focal length fG1n of the negative lens G1n. When |fG1p/fG1n| becomes less than the lower limit of Conditional Expression (12) and the focal length fG1p of the positive lens G1p becomes small, the refractive power of the positive lens G1p becomes too strong, as a result of which axial chromatic aberration frequently occurs at the positive lens G1p. Therefore, this is not desirable. When |fG1p/fG1n| becomes less than the lower limit of Conditional Expression (12) and the focal length fG1n of the negative lens G1n becomes large, the refractive power of the negative lens G1n becomes too weak. As a result, it becomes difficult to correct axial chromatic aberration and spherical aberration that occur at the positive lens G1p by the negative lens G1n. Therefore, this is not desirable.

When |fG1p/fG1n| becomes greater than the upper limit of Conditional Expression (12) and the focal length fG1p of the positive lens G1p becomes large, the refractive power of the positive lens G1p becomes too weak. As a result, light at the positive lens G1p cannot be sufficiently converged, and the effective diameter of a lens disposed on the image side of the positive lens G1p becomes large, thereby increasing the weight of the optical system. Therefore, this is not desirable.

Conditional Expression (13) is a conditional expression that prescribes the Abbe number vdG1n of the material of the negative lens G1n. By using a material having high dispersion as the material of the negative lens G1n included in the first lens unit B1 having a positive refractive power, it is possible to properly correct first-order chromatic aberration. When vdG1n becomes less than the lower limit of Conditional Expression (13), chromatic aberration of magnification is excessively corrected at the negative lens G1n. Therefore, this is not desirable. When vdG1n becomes greater than the upper limit of Conditional Expression (13), it becomes difficult to sufficiently correct chromatic aberration of magnification at the negative lens G1n. Therefore, this is not desirable.

The numerical ranges of Conditional Expressions (5) to (13) may be desirably set as follows:

$$0.030 < \theta gF\_G2p - (0.6438 - 0.001682 \times vdG2p) < 0.080 \quad (5a)$$

$$0.025 < \theta gF\_G3p - (0.6438 - 0.001682 \times vdG3p) < 0.080 \quad (6a)$$

$$LG2p/(LD-D12) > 0.85 \quad (7a)$$

$$LG3p/(LD-D12) > 0.75 \quad (8a)$$

$$\rho G1p < 2.8 \text{ [g/cm}^3\text{]} \quad (9a)$$

$$1.60 < fG1p/fG2p < 4.50 \quad (10a)$$

$$1.40 < fG1p/fG3p < 4.50 \quad (11a)$$

$$1.90 < |fG1p/fG1n| < 8.00 \quad (12a)$$

$$21.0 < vdG1n < 39.0 \quad (13a)$$

The numerical ranges of Conditional Expressions (5) to (13) may be more desirably set as follows:

$$0.040 < \theta gF\_G2p - (0.6438 - 0.001682 \times vdG2p) < 0.070 \quad (5b)$$

$$0.030 < \theta gF\_G3p - (0.6438 - 0.001682 \times vdG3p) < 0.070 \quad (6b)$$

$$LG2p/(LD-D12) > 0.90 \quad (7b)$$

$$LG3p/(LD-D12) > 0.80 \quad (8b)$$

$$\rho G1p < 2.7 \text{ [g/cm}^3\text{]} \quad (9b)$$

$$1.70 < fG1p/fG2p < 4.00 \quad (10b)$$

$$1.50 < fG1p/fG3p < 4.00 \quad (11b)$$

$$2.00 < |fG1p/fG1n| < 7.00 \quad (12b)$$

$$23.0 < vdG1n < 38.5 \quad (13b)$$

It is desirable that the second lens unit B2 that moves during focusing include positive and negative lenses. This makes it possible to suppress variations in chromatic aberration, in particular, axial chromatic aberration during focusing.

It is desirable that the second lens unit B2 include two lenses or less. This makes it possible to reduce the weight of the focusing unit, and to further reduce the size and weight of a mechanism for driving the second lens unit B2, which is the focusing unit.

Further, in the optical system according to each embodiment, it is desirable that the first lens unit B1 be immovable during focusing. The first lens unit B1 that is disposed closest to the object side among the lens units of the optical system has a large effective diameter and is heavy. In order to move the heavy first lens unit B1 during focusing, a large driving mechanism is required, as a result of which the weight of the optical system and the weight of an image pickup apparatus including the optical system are increased. Therefore, this is not desirable.

Numerical Examples 1 to 14 corresponding to the first to fourteenth embodiments according to the present invention are indicated. In each numerical example, i denotes the order of an optical surface from the object side. ri denotes a radius of curvature of an i-th optical surface (an i-th surface), di denotes an interval between the i-th surface and an (i+1)th surface, and ndi and vdi denote, respectively, the refractive index and the Abbe number of the material of an i-th optical member for a d-line. Regarding the change in interval between lens surfaces, the interval between lens surfaces when the lens is focused at infinity, and the interval between the lens surfaces when the lens is focused at a closest distance are indicated.

In each embodiment, a back focus (BF) refers to the distance from a surface of the optical system that is closest to the image side to the image plane in terms of air conversion length. Correspondences of the numerical examples with the aforementioned conditional expressions are shown in Table 1. In Table 1, $\Delta\theta gF\_Gi$ indicates the numerical value of $\theta gF\_Gi - (0.6438 - 0.001682 \times vdi)$.

A protective glass for protecting the lenses may be disposed on the object side of the first lens unit B1 in each embodiment. The protective glass having a very weak refractive power is assumed as not being included in the first lens unit B1.

Numerical Example 1
Units: mm
Surface Data

| Surface Number | r | d | nd | vd |
|---|---|---|---|---|
| Effective | Diameter | θgF | ΔθgF | |
| 1 | 150.642 | 16.15 | 1.59270 | 35.3 | 135.36 |
| 2 | 730.042 | 100.00 | | | 134.20 |
| 3 | 107.703 | 14.79 | 1.43387 | 95.1 | 84.27 |
| 0.5373 | 0.0534 | | | | |
| 4 | −328.442 | 0.27 | | | 82.15 |
| 5 | −318.403 | 3.00 | 1.85478 | 24.8 | 81.94 |
| 6 | 87.265 | 3.08 | | | 76.51 |

-continued

Numerical Example 1
Units: mm
Surface Data

| | | | | | |
|---|---|---|---|---|---|
| 7 | 88.737 | 12.63 | 1.43387 | 95.1 | 76.87 |
| 0.5373 | 0.0534 | | | | |
| 8 | −1026.629 | 35.00 | | | 76.22 |
| 9 | 68.568 | 6.10 | 1.89286 | 20.4 | 62.07 |
| 10 | 127.179 | 5.00 | | | 60.58 |
| 11 | 68.368 | 2.30 | 1.65412 | 39.7 | 55.04 |
| 12 | 43.418 | 1.15 | | | 51.09 |
| 13 | 48.830 | 7.97 | 1.43387 | 95.1 | 51.07 |
| 14 | 133.424 | 7.57 | | | 49.03 |
| 15 (aperture stop) | ∞ | (variable) | | | 44.73 |
| 16 | −3151.717 | 1.87 | 1.91082 | 35.3 | 40.00 |
| 17 | 61.271 | (variable) | | | 38.04 |
| 18 | 97.234 | 1.76 | 1.92286 | 20.9 | 33.23 |
| 19 | 63.011 | 9.17 | 1.56732 | 42.8 | 32.60 |
| 20 | −96.758 | 1.07 | | | 33.13 |
| 21 | 110.488 | 4.14 | 1.85025 | 30.1 | 32.94 |
| 22 | −106.157 | 1.44 | 1.59522 | 67.7 | 32.67 |
| 23 | 36.770 | 5.26 | | | 31.16 |
| 24 | −77.293 | 1.47 | 1.72916 | 54.7 | 31.20 |
| 25 | 75.820 | 4.11 | | | 32.49 |
| 26 | 89.505 | 10.00 | 1.64769 | 33.8 | 36.21 |
| 27 | −216.973 | 0.15 | | | 38.52 |
| 28 | 77.954 | 12.44 | 1.73800 | 32.3 | 39.99 |
| 29 | −58.563 | 2.00 | 1.80809 | 22.8 | 39.98 |
| 30 | ∞ | 65.15 | | | 40.13 |
| Image Plane | ∞ | | | | |

Various Data

| | |
|---|---|
| Focal Length | 392.55 |
| F-number | 2.90 |
| Half Angle of View | 3.15 |
| Image Height | 21.64 |
| Overall Lens Length | 371.25 |
| BF | 65.15 |
| ∞ | −0.16X |
| d15 | 5.89   20.04 |
| d17 | 30.34   16.19 |
| Position of Entrance Pupil | 532.27 |
| Position of Exit Pupil | −104.85 |
| Forward Principal Point Position | 18.38 |
| Rear Principal Point Position | −327.40 |

Lens Unit Data

| Unit | Starting Surface | Focal Length | Lens Structure Length | Forward Principal Point Position | Rear Principal Point Position |
|---|---|---|---|---|---|
| 1 | 1 | 175.07 | 215.00 | 163.73 | −118.69 |
| 2 | 16 | −65.97 | 1.87 | 0.96 | −0.02 |
| 3 | 18 | 183.65 | 53.01 | 23.36 | −15.91 |

Single Lens Data

| Lens | Starting Surface | Focal Length |
|---|---|---|
| 1 | 1 | 316.96 |
| 2 | 3 | 188.88 |
| 3 | 5 | −79.86 |
| 4 | 7 | 188.90 |
| 5 | 9 | 158.84 |
| 6 | 11 | −188.77 |
| 7 | 13 | 172.59 |
| 8 | 16 | −65.97 |
| 9 | 18 | −198.89 |
| 10 | 19 | 68.69 |
| 11 | 21 | 64.24 |
| 12 | 22 | −45.71 |
| 13 | 24 | −52.28 |
| 14 | 26 | 99.10 |

-continued

Numerical Example 1
Units: mm
Surface Data

| | | | | | |
|---|---|---|---|---|---|
| 15 | 28 | | | | 47.14 |
| 16 | 29 | | | | −72.47 |

Numerical Example 2

Units: mm
Surface Data

| Surface Number | r | d | nd | vd | |
|---|---|---|---|---|---|
| Effective | Diameter | θgF | ΔθgF | | |
| 1 | 304.232 | 11.77 | 1.59551 | 39.2 | 134.48 |
| 2 | −3473.263 | 130.00 | | | 133.88 |
| 3 | 135.555 | 14.53 | 1.43387 | 95.1 | 93.09 |
| 0.5373 | 0.0534 | | | | |
| 4 | −474.298 | 0.42 | | | 91.37 |
| 5 | −431.027 | 4.00 | 1.73800 | 32.3 | 91.22 |
| 6 | 247.150 | 3.00 | | | 88.10 |
| 7 | 88.485 | 12.33 | 1.43387 | 95.1 | 85.53 |
| 0.5373 | 0.0534 | | | | |
| 8 | 462.085 | 1.00 | | | 83.92 |
| 9 | 73.802 | 4.50 | 1.65412 | 39.7 | 77.43 |
| 10 | 57.758 | (variable) | | | 72.10 |
| 11 | 249.332 | 8.55 | 1.80809 | 22.8 | 60.63 |
| 12 | −145.324 | 2.60 | 1.85478 | 24.8 | 59.32 |
| 13 | 149.847 | (variable) | | | 56.49 |
| 14 (aperture stop) | ∞ | 6.99 | | | 40.88 |
| 15 | 236.895 | 1.90 | 1.83481 | 42.7 | 38.53 |
| 16 | 79.511 | 5.11 | 1.53775 | 74.7 | 37.72 |
| 17 | −211.462 | 41.94 | | | 37.34 |
| 18 | 270.103 | 2.34 | 1.80518 | 25.4 | 20.27 |
| 19 | −92.625 | 1.62 | 1.62299 | 58.2 | 19.86 |
| 20 | 39.986 | 2.11 | | | 18.85 |
| 21 | −65.825 | 1.57 | 1.77250 | 49.6 | 18.79 |
| 22 | 149.119 | 2.19 | | | 19.24 |
| 23 | 80.993 | 3.17 | 1.63980 | 34.5 | 20.64 |
| 24 | −114.908 | 50.87 | | | 21.09 |
| 25 | −494.014 | 7.22 | 1.67270 | 32.1 | 33.69 |
| 26 | −29.034 | 1.80 | 1.83481 | 42.7 | 34.04 |
| 27 | 143.833 | 1.45 | | | 36.41 |
| 28 | 81.978 | 9.87 | 1.73800 | 32.3 | 38.45 |
| 29 | −38.887 | 1.80 | 1.92286 | 18.9 | 38.93 |
| 30 | −74.668 | 65.00 | | | 40.16 |
| Image Plane | ∞ | | | | |

Various Data

| | | |
|---|---|---|
| Focal Length | 780.00 | |
| F-number | 5.80 | |
| Half Angle of View | 1.59 | |
| Image Height | 21.64 | |
| Overall Lens Length | 490.00 | |
| BF | 65.00 | |
| ∞ | −0.15X | |
| d10 | 35.94 | 72.66 |
| d13 | 54.41 | 17.69 |
| Position of Entrance Pupil | 862.03 | |
| Position of Exit Pupil | −239.64 | |
| Forward Principal Point Position | −355.06 | |
| Rear Principal Point Position | −715.00 | |

-continued

Units: mm
Surface Data

Lens Unit Data

| Unit | Starting Surface | Focal Length | Lens Structure Length | Forward Principal Point Position | Rear Principal Point Position |
|---|---|---|---|---|---|
| 1 | 1 | 298.08 | 181.56 | 38.61 | −127.38 |
| 2 | 11 | −374.69 | 11.15 | 13.67 | 7.28 |
| 3 | 14 | −654.05 | 141.95 | −152.97 | −439.31 |

Single Lens Data

| Lens | Starting Surface | Focal Length |
|---|---|---|
| 1 | 1 | 470.28 |
| 2 | 3 | 244.75 |
| 3 | 5 | −212.31 |
| 4 | 7 | 249.75 |
| 5 | 9 | −456.83 |
| 6 | 11 | 114.73 |
| 7 | 12 | −85.96 |
| 8 | 15 | −144.16 |
| 9 | 16 | 108.12 |
| 10 | 18 | 85.91 |
| 11 | 19 | −44.62 |
| 12 | 21 | −58.93 |
| 13 | 23 | 74.73 |
| 14 | 25 | 45.57 |
| 15 | 26 | −28.80 |
| 16 | 28 | 37.02 |
| 17 | 29 | −90.11 |

Numerical Example 3

Units: mm
Surface Data

| Surface Number | r | d | nd | vd | Effective Diameter | θgF | ΔθF |
|---|---|---|---|---|---|---|---|
| 1 | 302.631 | 13.68 | 1.53172 | 48.8 | 141.98 | | |
| 2 | −1528.554 | 150.00 | | | 141.38 | | |
| 3 | 111.159 | 17.83 | 1.43387 | 95.1 | 91.72 | 0.5373 | 0.0534 |
| 4 | −262.152 | 0.30 | | | 89.76 | | |
| 5 | −272.660 | 3.80 | 1.73800 | 32.3 | 89.31 | | |
| 6 | 128.018 | 0.50 | | | 84.42 | | |
| 7 | 82.578 | 13.73 | 1.43387 | 95.1 | 84.07 | 0.5373 | 0.0534 |
| 8 | 648.537 | 62.47 | | | 82.66 | | |
| 9 (aperture stop) | ∞ | 1.50 | | | 51.15 | | |
| 10 | 74.152 | 9.64 | 1.80809 | 22.8 | 48.30 | | |
| 11 | −92.697 | 1.50 | 1.90315 | 29.8 | 46.76 | | |
| 12 | 56.781 | (variable) | | | 42.24 | | |
| 13 | 100.319 | 1.80 | 1.80809 | 22.8 | 29.08 | | |
| 14 | 56.270 | 4.40 | 1.90366 | 31.3 | 28.33 | | |
| 15 | 157.977 | (variable) | | | 27.36 | | |
| 16 | 69.858 | 4.69 | 1.85478 | 24.8 | 25.00 | | |
| 17 | −79.548 | 1.62 | 1.76385 | 48.5 | 23.95 | | |
| 18 | 39.816 | 2.99 | | | 23.03 | | |
| 19 | −78.851 | 1.57 | 1.91082 | 35.3 | 23.10 | | |
| 20 | 119.107 | 3.02 | | | 23.76 | | |
| 21 | 122.941 | 4.72 | 1.51633 | 64.1 | 25.73 | | |
| 22 | −49.179 | 2.56 | | | 26.47 | | |
| 23 | −43.755 | 1.70 | 1.76385 | 48.5 | 26.94 | | |
| 24 | −95.999 | 22.67 | | | 28.05 | | |
| 25 | 218.669 | 8.46 | 1.73800 | 32.3 | 39.79 | | |
| 26 | −43.667 | 1.90 | 1.92286 | 18.9 | 40.29 | | |
| 27 | −79.787 | 85.94 | | | 41.38 | | |
| Image Plane | ∞ | | | | | | |

Various Data

| | |
|---|---|
| Focal Length | 584.98 |
| F-number | 4.12 |
| Half Angle of View | 2.12 |
| Image Height | 21.64 |
| Overall Lens Length | 476.10 |
| BF | 85.94 |
| ∞ | −0.14X |
| d12 | 48.06 4.82 |
| d15 | 5.05 48.29 |
| Position of Entrance Pupil | 618.32 |
| Position of Exit Pupil | −265.10 |
| Forward Principal Point Position | 228.49 |
| Rear Principal Point Position | −499.04 |

Lens Unit Data

| Unit | Starting Surface | Focal Length | Lens Structure Length | Forward Principal Point Position | Rear Principal Point Position |
|---|---|---|---|---|---|
| 1 | 1 | 492.97 | 274.95 | −443.17 | −343.41 |
| 2 | 13 | 238.41 | 6.20 | −4.10 | −7.28 |
| 3 | 16 | −1576.39 | 55.91 | −594.87 | −1036.81 |

Single Lens Data

| Lens | Starting Surface | Focal Length |
|---|---|---|
| 1 | 1 | 476.33 |
| 2 | 3 | 182.55 |
| 3 | 5 | −117.57 |
| 4 | 7 | 216.51 |
| 5 | 10 | 52.33 |
| 6 | 11 | −38.80 |
| 7 | 13 | −161.53 |
| 8 | 14 | 94.77 |
| 9 | 16 | 44.15 |
| 10 | 17 | −34.54 |
| 11 | 19 | −51.89 |
| 12 | 21 | 68.67 |
| 13 | 23 | −106.76 |
| 14 | 25 | 50.01 |
| 15 | 26 | −107.23 |

Numerical Example 4

Units: mm
Surface Data

| Surface Number | r | d | nd | vd | Effective Diameter | θgF | ΔθgF |
|---|---|---|---|---|---|---|---|
| 1 | 303.500 | 14.27 | 1.48749 | 70.2 | 141.99 | | |
| 2 | −1119.197 | 125.00 | | | 141.42 | | |
| 3 | 133.848 | 18.28 | 1.43387 | 95.1 | 100.56 | 0.5373 | 0.0534 |
| 4 | −278.409 | 1.00 | | | 98.74 | | |
| 5 | −272.653 | 4.45 | 1.67300 | 38.1 | 97.88 | | |
| 6 | 341.744 | 7.63 | | | 93.96 | | |
| 7 | 85.208 | 13.41 | 1.43387 | 95.1 | 88.08 | 0.5373 | 0.0534 |
| 8 | 451.394 | 1.00 | | | 86.17 | | |
| 9 | 68.525 | 5.00 | 1.51742 | 52.4 | 77.54 | | |

-continued

Units: mm
Surface Data

| | | | | | |
|---|---|---|---|---|---|
| 10 | 52.234 | (variable) | | | 70.88 |
| 11 | 477.269 | 7.06 | 1.80809 | 22.8 | 64.98 |
| 12 | −180.144 | 2.60 | 1.85025 | 30.1 | 63.77 |
| 13 | 158.963 | (variable) | | | 60.68 |
| 14 (aperture stop) | ∞ | 6.99 | | | 43.66 |
| 15 | 1790.868 | 1.90 | 1.83481 | 42.7 | 41.15 |
| 16 | 53.608 | 8.55 | 1.59522 | 67.7 | 40.01 |
| 17 | −120.253 | 17.05 | | | 39.67 |
| 18 | 99.470 | 4.03 | 1.80518 | 25.4 | 31.84 |
| 19 | −110.952 | 1.62 | 1.62299 | 58.2 | 31.25 |
| 20 | 41.547 | 4.33 | | | 28.91 |
| 21 | −68.903 | 1.57 | 1.77250 | 49.6 | 28.86 |
| 22 | 209.179 | 3.12 | | | 29.01 |
| 23 | 99.162 | 3.52 | 1.73800 | 32.3 | 29.71 |
| 24 | −277.851 | 48.07 | | | 29.67 |
| 25 | 161.753 | 6.28 | 1.73800 | 32.3 | 39.71 |
| 26 | −73.339 | 1.90 | 1.92286 | 18.9 | 39.80 |
| 27 | −283.372 | 93.89 | | | 40.13 |
| Image Plane | ∞ | | | | |

Various Data

| | |
|---|---|
| Focal Length | 584.99 |
| F-number | 4.12 |
| Half Angle of View | 2.12 |
| Image Height | 21.64 |
| Overall Lens Length | 476.09 |
| BF | 93.89 |
| ∞ | −0.14X |
| d10 | 22.54  47.33 |
| d13 | 51.04  26.25 |
| Position of Entrance Pupil | 786.58 |
| Position of Exit Pupil | −161.90 |
| Forward Principal Point Position | 33.70 |
| Rear Principal Point Position | −491.10 |

Lens Unit Data

| Unit | Starting Surface | Focal Length | Lens Structure Length | Forward Principal Point Position | Rear Principal Point Position |
|---|---|---|---|---|---|
| 1 | 1 | 241.29 | 190.04 | 75.74 | −108.88 |
| 2 | 11 | −260.30 | 9.66 | 7.63 | 2.26 |
| 3 | 14 | −13347.44 | 108.92 | −4161.70 | −6209.10 |

Single Lens Data

| Lens | Starting Surface | Focal Length |
|---|---|---|
| 1 | 1 | 491.38 |
| 2 | 3 | 211.17 |
| 3 | 5 | −224.69 |
| 4 | 7 | 239.44 |
| 5 | 9 | −474.28 |
| 6 | 11 | 162.62 |
| 7 | 12 | −98.97 |
| 8 | 15 | −66.23 |
| 9 | 16 | 63.46 |
| 10 | 18 | 65.70 |
| 11 | 19 | −48.32 |
| 12 | 21 | −66.93 |
| 13 | 23 | 99.42 |
| 14 | 25 | 69.16 |
| 15 | 26 | −107.69 |

Numerical Example 5

Units: mm
Surface Data

| Surface Number | r | d | nd | vd | Effective Diameter | θgF | ΔθgF |
|---|---|---|---|---|---|---|---|
| 1 | 256.651 | 12.30 | 1.53172 | 48.8 | 118.70 | | |
| 2 | −898.293 | 100.00 | | | 118.14 | | |
| 3 | 123.678 | 14.23 | 1.43387 | 95.1 | 82.63 | 0.5373 | 0.0534 |
| 4 | −250.852 | 0.30 | | | 80.94 | | |
| 5 | −236.670 | 3.50 | 1.73800 | 32.3 | 80.85 | | |
| 6 | 159.068 | 1.00 | | | 77.47 | | |
| 7 | 73.782 | 12.65 | 1.43387 | 95.1 | 76.56 | 0.5373 | 0.0534 |
| 8 | 562.749 | 1.00 | | | 75.14 | | |
| 9 | 50.236 | 3.50 | 1.73800 | 32.3 | 67.65 | | |
| 10 | 44.936 | 47.20 | | | 63.78 | | |
| 11 | 81.633 | 7.02 | 1.80809 | 22.8 | 45.69 | | |
| 12 | −345.170 | 2.00 | 1.90366 | 31.3 | 44.08 | | |
| 13 | 59.571 | 12.67 | | | 40.95 | | |
| 14 (aperture stop) | ∞ | (variable) | | | 38.36 | | |
| 15 | 72.373 | 1.85 | 1.90366 | 31.3 | 30.81 | | |
| 16 | 70.798 | 3.44 | 1.53775 | 74.7 | 30.16 | | |
| 17 | 618.776 | (variable) | | | 29.48 | | |
| 18 | 112.273 | 3.56 | 1.84666 | 23.8 | 28.12 | | |
| 19 | −85.446 | 1.61 | 1.77250 | 49.6 | 27.52 | | |
| 20 | 43.801 | 3.33 | | | 25.58 | | |
| 21 | −71.870 | 1.50 | 1.91082 | 35.3 | 25.51 | | |
| 22 | 7154.260 | 12.83 | | | 25.59 | | |
| 23 | −86.248 | 2.42 | 1.61340 | 44.3 | 29.01 | | |
| 24 | −66.648 | 20.00 | | | 29.85 | | |
| 25 | 134.333 | 8.24 | 1.67300 | 38.1 | 39.36 | | |
| 26 | −50.197 | 1.80 | 1.80809 | 22.8 | 39.68 | | |
| 27 | −115.724 | 106.46 | | | 40.39 | | |
| Image Plane | ∞ | | | | | | |

Various Data

| | |
|---|---|
| Focal Length | 489.05 |
| F-number | 4.12 |
| Half Angle of View | 2.53 |
| Image Height | 21.64 |
| Overall Lens Length | 411.08 |
| BF | 106.46 |
| ∞ | −0.14X |
| d14 | 24.67  2.00 |
| d17 | 2.00  24.67 |
| Position of Entrance Pupil | 565.70 |
| Position of Exit Pupil | −158.34 |
| Forward Principal Point Position | 151.57 |
| Rear Principal Point Position | −382.58 |

Lens Unit Data

| Unit | Starting Surface | Focal Length | Lens Structure Length | Forward Principal Point Position | Rear Principal Point Position |
|---|---|---|---|---|---|
| 1 | 1 | 414.18 | 204.70 | −309.53 | −268.47 |
| 2 | 14 | 152.99 | 29.96 | 23.47 | −4.38 |
| 3 | 18 | −441.84 | 55.28 | −166.34 | −347.04 |

Single Lens Data

| Lens | Starting Surface | Focal Length |
|---|---|---|
| 1 | 1 | 376.81 |
| 2 | 3 | 193.15 |
| 3 | 5 | −128.42 |
| 4 | 7 | 194.19 |
| 5 | 9 | −802.16 |
| 6 | 11 | 82.30 |

-continued

Units: mm
Surface Data

| 7 | 12 | −56.09 |
| 8 | 15 | −8138.48 |
| 9 | 16 | 148.34 |
| 10 | 18 | 57.78 |
| 11 | 19 | −37.28 |
| 12 | 21 | −78.11 |
| 13 | 23 | 456.65 |
| 14 | 25 | 55.29 |
| 15 | 26 | −111.07 |

Numerical Example 6

Units: mm
Surface Data

| Surface Number | r | d | nd | vd |
|---|---|---|---|---|
| Effective | Diameter | θgF | ΔθgF | |
| 1 | 303.613 | 11.69 | 1.54814 | 45.8 | 118.70 |
| 2 | −720.087 | 95.00 | | | 118.22 |
| 3 | 145.704 | 14.21 | 1.43387 | 95.1 | 85.77 |
| 0.5373 | 0.0534 | | | | |
| 4 | −228.748 | 0.30 | | | 84.22 |
| 5 | −214.415 | 3.50 | 1.74950 | 35.3 | 84.19 |
| 6 | 190.939 | 2.00 | | | 81.27 |
| 7 | 78.997 | 14.38 | 1.43387 | 95.1 | 80.42 |
| 0.5373 | 0.0534 | | | | |
| 8 | 1108.619 | 1.00 | | | 78.73 |
| 9 | 54.119 | 3.50 | 1.73800 | 32.3 | 71.00 |
| 10 | 47.476 | 66.65 | | | 66.93 |
| 11 | 87.668 | 4.79 | 1.80809 | 22.8 | 42.48 |
| 12 | 171.534 | 2.00 | 1.91082 | 35.3 | 40.89 |
| 13 | 66.228 | 7.96 | | | 39.19 |
| 14 (aperture stop) | ∞ | (variable) | | | |
| 37.65 | | | | | |
| 15 | 76.142 | 1.85 | 1.90366 | 31.3 | 29.64 |
| 16 | 75.600 | 3.27 | 1.53775 | 74.7 | 29.01 |
| 17 | 778.003 | (variable) | | | 28.33 |
| 18 | 123.763 | 3.56 | 1.84666 | 23.8 | 26.99 |
| 19 | −70.153 | 1.61 | 1.77250 | 49.6 | 26.40 |
| 20 | 41.736 | 3.54 | | | 24.48 |
| 21 | −68.635 | 1.50 | 1.91082 | 35.3 | 24.32 |
| 22 | −1082.263 | 4.25 | | | 24.42 |
| 23 | −62.341 | 2.40 | 1.67300 | 38.1 | 24.59 |
| 24 | −48.987 | 31.15 | | | 25.36 |
| 25 | 107.183 | 8.24 | 1.67300 | 38.1 | 39.48 |
| 26 | −54.390 | 1.80 | 1.80809 | 22.8 | 39.71 |
| 27 | −153.673 | 94.42 | | | 40.28 |
| Image Plane | ∞ | | | | |

Various Data

| Focal Length | 489.05 | |
| F-number | 4.12 | |
| Half Angle of View | 2.53 | |
| Image Height | 21.64 | |
| Overall Lens Length | 411.08 | |
| BF | 94.42 | |
| ∞ | −0.14X | |
| d14 | 24.52 | 2.00 |
| d17 | 2.00 | 24.52 |
| Position of Entrance Pupil | 605.93 | |
| Position of Exit Pupil | −158.62 | |
| Forward Principal Point Position | 149.81 | |
| Rear Principal Point Position | −394.63 | |

-continued

Units: mm
Surface Data

Lens Unit Data

| Unit | Starting Surface | Focal Length | Lens Structure Length | Forward Principal Point Position | Rear Principal Point Position |
|---|---|---|---|---|---|
| 1 | 1 | 383.47 | 219.01 | −229.79 | −254.89 |
| 2 | 14 | 155.98 | 29.64 | 23.46 | −4.15 |
| 3 | 18 | −376.55 | 58.04 | −140.90 | −308.38 |

Single Lens Data

| Lens | Starting Surface | Focal Length |
|---|---|---|
| 1 | 1 | 391.20 |
| 2 | 3 | 207.53 |
| 3 | 5 | −134.26 |
| 4 | 7 | 195.22 |
| 5 | 9 | −675.14 |
| 6 | 11 | 216.37 |
| 7 | 12 | −119.52 |
| 8 | 15 | 18912.95 |
| 9 | 16 | 155.46 |
| 10 | 18 | 53.33 |
| 11 | 19 | −33.66 |
| 12 | 21 | −80.51 |
| 13 | 23 | 316.92 |
| 14 | 25 | 54.73 |
| 15 | 26 | −105.03 |

Numerical Example 7

Units: mm
Surface Data

| Surface Number | r | d | nd | vd |
|---|---|---|---|---|
| Effective | Diameter | θgF | ΔθgF | |
| 1 | 272.017 | 15.63 | 1.53172 | 48.8 | 135.37 |
| 2 | −661.466 | 75.00 | | | 134.73 |
| 3 | 161.777 | 18.72 | 1.43387 | 95.1 | 101.09 |
| 0.5373 | 0.0534 | | | | |
| 4 | −196.205 | 0.20 | | | 99.09 |
| 5 | −199.530 | 4.30 | 1.73800 | 32.3 | 98.73 |
| 6 | 281.165 | 0.50 | | | 94.56 |
| 7 | 92.859 | 12.89 | 1.43387 | 95.1 | 92.38 |
| 0.5373 | 0.0534 | | | | |
| 8 | 395.372 | 50.00 | | | 90.76 |
| 9 | 91.563 | 6.68 | 1.92286 | 18.9 | 57.92 |
| 10 | 21270.468 | 1.80 | 1.85478 | 24.8 | 56.63 |
| 11 | 53.190 | 17.97 | | | 51.03 |
| 12 (aperture stop) | ∞ | (variable) | | | |
| 47.07 | | | | | |
| 13 | 72.592 | 5.63 | 1.59522 | 67.7 | 34.46 |
| 14 | −269.274 | 1.70 | 1.51633 | 64.1 | 33.25 |
| 15 | 189.489 | (variable) | | | 32.01 |
| 16 | 133.885 | 4.62 | 1.84666 | 23.8 | 27.82 |
| 17 | −109.073 | 1.71 | 1.65160 | 58.5 | 26.59 |
| 18 | 41.354 | 3.05 | | | 24.48 |
| 19 | −76.188 | 1.63 | 1.88300 | 40.8 | 24.53 |
| 20 | 142.443 | 11.01 | | | 25.43 |
| 21 | 523.344 | 5.91 | 1.61340 | 44.3 | 33.31 |
| 22 | −41.876 | 2.00 | 1.69895 | 30.1 | 34.14 |

-continued

Units: mm

Surface Data

| | | | | | |
|---|---|---|---|---|---|
| 23 | −87.849 | 17.30 | | | 35.78 |
| 24 | 86.521 | 9.20 | 1.61340 | 44.3 | 45.71 |
| 25 | −70.765 | 1.91 | 1.80809 | 22.8 | 45.84 |
| 26 | −141.307 | 60.00 | | | 46.30 |
| Image Plane | ∞ | | | | |

Various Data

| | | |
|---|---|---|
| Focal Length | 392.57 | |
| F-number | 2.90 | |
| Half Angle of View | 3.15 | |
| Image Height | 21.64 | |
| Overall Lens Length | 371.15 | |
| BF | 60.00 | |
| ∞ | −0.16X | |
| d12 | 34.43 | 1.00 |
| d15 | 7.36 | 40.79 |
| Position of Entrance Pupil | 497.61 | |
| Position of Exit Pupil | −312.22 | |
| Forward Principal Point Position | 476.15 | |
| Rear Principal Point Position | −332.57 | |

-continued

Units: mm

Surface Data

Lens Unit Data

| Unit | Starting Surface | Focal Length | Lens Structure Length | Forward Principal Point Position | Rear Principal Point Position |
|---|---|---|---|---|---|
| 1 | 1 | 394.38 | 185.72 | −252.79 | −240.54 |
| 2 | 12 | 170.54 | 41.75 | 32.44 | −6.55 |
| 3 | 16 | 591.22 | 58.35 | 271.96 | 414.18 |

Single Lens Data

| Lens | Starting Surface | Focal Length |
|---|---|---|
| 1 | 1 | 364.63 |
| 2 | 3 | 207.65 |
| 3 | 5 | −157.54 |
| 4 | 7 | 276.16 |
| 5 | 9 | 99.63 |
| 6 | 10 | −62.38 |
| 7 | 13 | 96.66 |
| 8 | 14 | −215.14 |
| 9 | 16 | 71.62 |
| 10 | 17 | −45.81 |
| 11 | 19 | −56.02 |
| 12 | 21 | 63.46 |
| 13 | 22 | −116.57 |
| 14 | 24 | 64.91 |
| 15 | 25 | −177.56 |

Numerical Example 8

Units: mm

Surface Data

| Surface Number | r | d | nd | vd | Effective Diameter | θgF | ΔθgF |
|---|---|---|---|---|---|---|---|
| 1 | 385.526 | 13.44 | 1.51823 | 58.9 | 134.25 | | |
| 2 | −571.729 | 77.00 | | | 133.81 | | |
| 3 | 138.510 | 20.20 | 1.43387 | 95.1 | 105.47 | 0.5373 | 0.0534 |
| 4 | −239.954 | 0.88 | | | 103.58 | | |
| 5 | −236.997 | 4.45 | 1.72047 | 34.7 | 102.71 | | |
| 6 | 413.620 | 1.96 | | | 98.82 | | |
| 7 | 89.685 | 13.98 | 1.49700 | 81.5 | 94.58 | 0.5375 | 0.0309 |
| 8 | 401.260 | 1.00 | | | 92.61 | | |
| 9 | 73.362 | 4.00 | 1.51633 | 64.1 | 83.23 | | |
| 10 | 55.381 | (variable) | | | 76.71 | | |
| 11 | 676.714 | 8.83 | 1.80809 | 22.8 | 71.19 | | |
| 12 | −131.916 | 2.50 | 1.85025 | 30.1 | 69.98 | | |
| 13 | 177.931 | (variable) | | | 66.25 | | |
| 14(aperture stop) | ∞ | 6.99 | | | 47.46 | | |
| 15 | 389.162 | 1.90 | 1.83481 | 42.7 | 44.83 | | |
| 16 | 50.248 | 10.20 | 1.59522 | 67.7 | 43.35 | | |
| 17 | −104.244 | 21.30 | | | 42.94 | | |
| 18 | 62.380 | 4.41 | 1.80518 | 25.4 | 30.44 | | |
| 19 | −125.782 | 1.62 | 1.62299 | 58.2 | 29.62 | | |
| 20 | 29.348 | 4.45 | | | 26.31 | | |
| 21 | −76.872 | 1.50 | 1.77250 | 49.6 | 26.33 | | |
| 22 | 90.429 | 3.40 | | | 27.45 | | |
| 23 | 62.033 | 5.17 | 1.73800 | 32.3 | 31.17 | | |
| 24 | −269.003 | 11.30 | | | 31.75 | | |
| 25 | 63.333 | 7.28 | 1.73800 | 32.3 | 35.82 | | |
| 26 | −65.540 | 1.50 | 1.92286 | 18.9 | 35.62 | | |
| 27 | 179.797 | 60.88 | | | 35.48 | | |
| Image Plane | ∞ | | | | | | |

Various Data

| | |
|---|---|
| Focal Length | 392.00 |
| F-number | 2.92 |
| Half Angle of View | 3.16 |

-continued

| Units: mm | |
|---|---|
| Image Height | 21.64 |
| Overall Lens Length | 371.00 |
| BF | 60.88 |

| | ∞ | −0.17X |
|---|---|---|
| d10 | 23.34 | 58.96 |
| d13 | 57.54 | 21.92 |

| | |
|---|---|
| Position of Entrance Pupil | 604.24 |
| Position of Exit Pupil | −69.07 |
| Forward Principal Point Position | −186.31 |
| Rear Principal Point Position | −331.12 |

Lens Unit Data

| Unit | Starting Surface | Focal Length | Lens Structure Length | Forward Principal Point Position | Rear Principal Point Position |
|---|---|---|---|---|---|
| 1 | 1 | 218.77 | 136.91 | 38.12 | −80.51 |
| 2 | 11 | −258.49 | 11.33 | 8.11 | 1.81 |
| 3 | 14 | −1780.17 | 81.01 | 39.35 | −30.56 |

Single Lens Data

| Lens | Starting Surface | Focal Length |
|---|---|---|
| 1 | 1 | 446.46 |
| 2 | 3 | 205.73 |
| 3 | 5 | −208.53 |
| 4 | 7 | 228.98 |
| 5 | 9 | −473.50 |
| 6 | 11 | 137.28 |
| 7 | 12 | −88.77 |
| 8 | 15 | −69.29 |
| 9 | 16 | 58.40 |
| 10 | 18 | 52.34 |
| 11 | 19 | −38.04 |
| 12 | 21 | −53.58 |
| 13 | 23 | 68.76 |
| 14 | 25 | 44.72 |
| 15 | 26 | −51.89 |

Numerical Example 9

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 253.206 | 15.70 | 1.53172 | 48.8 | 135.37 | | |
| 2 | −794.645 | 80.00 | | | 134.68 | | |
| 3 | 120.312 | 19.13 | 1.43387 | 95.1 | 98.20 | 0.5373 | 0.0534 |
| 4 | −255.664 | 0.27 | | | 95.99 | | |
| 5 | −251.994 | 4.30 | 1.73800 | 32.3 | 95.75 | | |
| 6 | 185.815 | 2.00 | | | 90.53 | | |
| 7 | 78.093 | 14.41 | 1.43387 | 95.1 | 87.97 | 0.5373 | 0.0534 |
| 8 | 395.372 | 1.00 | | | 86.16 | | |
| 9 | 65.333 | 5.00 | 1.73800 | 32.3 | 77.77 | | |
| 10 | 52.898 | 55.75 | | | 71.52 | | |
| 11 | 131.577 | 5.85 | 1.92286 | 18.9 | 47.81 | | |
| 12 | −173.016 | 1.80 | 2.00100 | 29.1 | 46.87 | | |
| 13 | 79.693 | 5.11 | | | 44.10 | | |
| 14(aperture stop) | ∞ | (variable) | | | 43.54 | | |
| 15 | 84.346 | 5.20 | 1.76385 | 48.5 | 34.24 | | |
| 16 | −330.244 | 1.50 | 1.78760 | 23.4 | 33.22 | | |
| 17 | 500.351 | (variable) | | | 32.49 | | |
| 18 | 119.964 | 5.15 | 1.84666 | 23.8 | 28.83 | | |
| 19 | −81.582 | 1.71 | 1.67790 | 55.3 | 27.56 | | |
| 20 | 38.192 | 3.96 | | | 26.61 | | |

-continued

| | | Units: mm | | | |
|---|---|---|---|---|---|
| 21 | −65.854 | 1.63 | 1.76200 | 40.1 | 26.66 |
| 22 | 131.367 | 11.01 | | | 27.85 |
| 23 | 595.238 | 4.99 | 1.51633 | 64.1 | 36.10 |
| 24 | −86.999 | 10.16 | | | 37.37 |
| 25 | 76.297 | 10.02 | 1.61340 | 44.3 | 44.95 |
| 26 | −60.967 | 1.91 | 1.92286 | 18.9 | 45.06 |
| 27 | −120.249 | 66.01 | | | 45.73 |
| Image Plane | ∞ | | | | |

| Various Data | |
|---|---|
| Focal Length | 392.57 |
| F-number | 2.90 |
| Half Angle of View | 3.15 |
| Image Height | 21.64 |
| Overall Lens Length | 371.15 |
| BF | 66.01 |

| | ∞ | −0.16X |
|---|---|---|
| d14 | 31.55 | 1.00 |
| d17 | 6.03 | 36.58 |

| | |
|---|---|
| Position of Entrance Pupil | 548.07 |
| Position of Exit Pupil | −202.24 |
| Forward Principal Point Position | 366.12 |
| Rear Principal Point Position | −326.56 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 478.88 | 205.21 | −475.87 | −321.17 |
| 2 | 14 | 133.94 | 38.25 | 30.72 | −4.59 |
| 3 | 18 | 3089.85 | 50.55 | 1169.58 | 1813.90 |

| Single Lens Data | | |
|---|---|---|
| Lens | Starting Surface | Focal Length |
| 1 | 1 | 363.02 |
| 2 | 3 | 191.51 |
| 3 | 5 | −144.32 |
| 4 | 7 | 221.25 |
| 5 | 9 | −454.12 |
| 6 | 11 | 81.74 |
| 7 | 12 | −54.31 |
| 8 | 15 | 88.44 |
| 9 | 16 | −252.39 |
| 10 | 18 | 58.03 |
| 11 | 19 | −38.15 |
| 12 | 21 | −57.36 |
| 13 | 23 | 147.38 |
| 14 | 25 | 56.82 |
| 15 | 26 | −136.11 |

Numerical Example 10

| | | Units: mm | | | | | |
|---|---|---|---|---|---|---|---|
| | | Surface Data | | | | | |
| Surface Number | r | d | nd | vd | Effective Diameter | θgF | ΔθgF |
| 1 | 294.571 | 10.93 | 1.59270 | 35.3 | 00.87 | | |
| 2 | −427.284 | 50.00 | | | 100.40 | | |
| 3 | 87.155 | 16.09 | 1.43387 | 95.1 | 78.40 | 0.5373 | 0.0534 |
| 4 | −250.471 | 0.20 | | | 76.31 | | |
| 5 | −248.732 | 3.30 | 1.85478 | 24.8 | 76.12 | | |
| 6 | 245.249 | 0.30 | | | 73.12 | | |

-continued

| Units: mm | | | | | | | |
|---|---|---|---|---|---|---|---|
| 7 | 57.005 | 12.25 | 1.43387 | 95.1 | 69.69 | 0.5373 | 0.0534 |
| 8 | 208.094 | 0.50 | | | 67.55 | | |
| 9 | 48.647 | 4.50 | 1.85478 | 24.8 | 60.46 | | |
| 10 | 39.822 | 34.21 | | | 54.77 | | |
| 11 | 110.427 | 4.43 | 1.92286 | 18.9 | 38.11 | | |
| 12 | −234.759 | 1.50 | 1.91082 | 35.3 | 37.06 | | |
| 13 | 45.695 | 5.31 | | | 34.20 | | |
| 14(aperture stop) | ∞ | (variable) | | | 33.67 | | |
| 15 | 48.513 | 6.40 | 1.59522 | 67.7 | 28.74 | | |
| 16 | −47.434 | 1.70 | 1.72916 | 54.7 | 27.90 | | |
| 17 | −203.760 | (variable) | | | 26.86 | | |
| 18 | 118.337 | 4.05 | 1.84666 | 23.9 | 24.81 | | |
| 19 | −53.903 | 1.50 | 1.77250 | 49.6 | 23.88 | | |
| 20 | 34.010 | 3.73 | | | 22.69 | | |
| 21 | −53.303 | 1.50 | 1.80610 | 40.9 | 22.89 | | |
| 22 | 148.382 | 15.17 | | | 24.15 | | |
| 23 | 580.743 | 4.75 | 1.51742 | 52.4 | 37.96 | | |
| 24 | −79.778 | 0.20 | | | 39.06 | | |
| 25 | 79.802 | 10.01 | 1.65412 | 39.7 | 42.17 | | |
| 26 | −47.847 | 1.80 | 1.92286 | 18.9 | 42.40 | | |
| 27 | −95.313 | 60.48 | | | 43.34 | | |
| Image Plane | ∞ | | | | | | |

| Various Data | |
|---|---|
| Focal Length | 292.52 |
| F-number | 2.90 |
| Half Angle of View | 4.23 |
| Image Height | 21.64 |
| Overall Lens Length | 273.26 |
| BF | 60.48 |

| | ∞ | −0.17X |
|---|---|---|
| d14 | 16.44 | 1.00 |
| d17 | 1.99 | 17.44 |

| | |
|---|---|
| Position of Entrance Pupil | 343.18 |
| Position of Exit Pupil | −133.95 |
| Forward Principal Point Position | 195.61 |
| Rear Principal Point Position | −232.04 |

Lens Unit Data

| Unit | Starting Surface | Focal Length | Lens Structure Length | Forward Principal Point Position | Rear Principal Point Position |
|---|---|---|---|---|---|
| 1 | 1 | 383.25 | 138.21 | −430.69 | −251.00 |
| 2 | 14 | 77.20 | 24.54 | 16.95 | −4.53 |
| 3 | 18 | −683.60 | 42.71 | −275.39 | −521.08 |

Single Lens Data

| Lens | Starting Surface | Focal Length |
|---|---|---|
| 1 | 1 | 295.85 |
| 2 | 3 | 151.20 |
| 3 | 5 | −144.03 |
| 4 | 7 | 176.63 |
| 5 | 9 | −335.68 |
| 6 | 11 | 81.88 |
| 7 | 12 | −41.89 |
| 8 | 15 | 41.32 |
| 9 | 16 | −85.18 |
| 10 | 18 | 44.22 |
| 11 | 19 | −26.79 |
| 12 | 21 | −48.49 |
| 13 | 23 | 135.90 |
| 14 | 25 | 47.19 |
| 15 | 26 | −106.04 |

Numerical Example 11

| Units: mm | | | | | | |
|---|---|---|---|---|---|---|
| Surface Data | | | | | | |
| Surface Number | r | d | nd | vd | Effective Diameter | θgF | ΔθgF |
| 1 | 99.464 | 14.87 | 1.59270 | 35.3 | 101.04 | | |
| 2 | 456.909 | 64.58 | | | 99.29 | | |
| 3 | 80.681 | 11.90 | 1.43387 | 95.1 | 62.00 | 0.5373 | 0.0534 |
| 4 | −167.967 | 0.15 | | | 60.11 | | |
| 5 | −166.869 | 2.30 | 1.85478 | 24.8 | 59.92 | | |
| 6 | 51.072 | 0.15 | | | 54.95 | | |
| 7 | 50.726 | 11.60 | 1.43387 | 95.1 | 55.04 | 0.5373 | 0.0534 |
| 8 | −770.506 | 10.68 | | | 54.62 | | |
| 9 | 59.715 | 3.81 | 1.89286 | 20.4 | 50.66 | | |
| 10 | 74.063 | 8.36 | | | 49.33 | | |
| 11 | 58.185 | 2.00 | 1.65412 | 39.7 | 45.60 | | |
| 12 | 45.596 | 1.04 | | | 43.86 | | |
| 13 | 51.918 | 6.42 | 1.90366 | 31.3 | 43.79 | | |
| 14 | 206.154 | 3.00 | | | 42.24 | | |
| 15(aperture stop) | ∞ | (variable) | | | 40.40 | | |
| 16 | 2015.159 | 1.90 | 1.91082 | 35.3 | 37.51 | | |
| 17 | 32.641 | 3.50 | 1.84666 | 23.8 | 34.33 | | |
| 18 | 43.038 | (variable) | | | 33.42 | | |
| 19 | 64.610 | 5.62 | 1.49700 | 81.5 | 31.81 | | |
| 20 | −78.046 | 1.00 | | | 31.84 | | |
| 21 | 469.814 | 3.84 | 1.85478 | 24.8 | 30.43 | | |
| 22 | −64.210 | 1.50 | 1.60311 | 60.6 | 30.18 | | |
| 23 | 33.512 | 7.59 | | | 28.87 | | |
| 24 | −47.827 | 1.50 | 1.60311 | 60.6 | 29.44 | | |
| 25 | 93.980 | 2.80 | | | 31.60 | | |
| 26 | 77.014 | 6.40 | 1.59551 | 39.2 | 36.97 | | |
| 27 | −82.425 | 0.42 | | | 37.69 | | |
| 28 | 108.793 | 10.03 | 1.85478 | 24.8 | 38.99 | | |
| 29 | −32.591 | 2.00 | 1.89286 | 20.4 | 38.97 | | |
| 30 | 1236.437 | 63.67 | | | 39.14 | | |
| Image Plane | ∞ | | | | | | |

| Various Data | |
|---|---|
| Focal Length | 292.46 |
| F-number | 2.90 |
| Half Angle of View | 4.23 |
| Image Height | 21.64 |
| Overall Lens Length | 273.23 |
| BF | 63.67 |

| | ∞ | −0.16X |
|---|---|---|
| d12 | 2.91 | 10.48 |
| d15 | 17.66 | 10.09 |

| | |
|---|---|
| Position of Entrance Pupil | 301.22 |
| Position of Exit Pupil | −69.46 |
| Forward Principal Point Position | −48.75 |
| Rear Principal Point Position | −228.78 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 112.19 | 140.87 | 122.13 | −68.98 |
| 2 | 16 | −47.10 | 5.40 | 2.77 | −0.11 |
| 3 | 19 | 167.49 | 42.71 | 18.20 | −15.09 |

| Single Lens Data | | |
|---|---|---|
| Lens | Starting Surface | Focal Length |
| 1 | 1 | 211.24 |
| 2 | 3 | 127.46 |
| 3 | 5 | −45.53 |
| 4 | 7 | 110.16 |
| 5 | 9 | 306.80 |
| 6 | 11 | −343.79 |

-continued

| | | Units: mm |
|---|---|---|
| 7 | 13 | 75.30 |
| 8 | 16 | −36.44 |
| 9 | 17 | 138.24 |
| 10 | 19 | 72.07 |
| 11 | 21 | 66.31 |
| 12 | 22 | −36.30 |
| 13 | 24 | −52.35 |
| 14 | 26 | 67.87 |
| 15 | 28 | 30.33 |
| 16 | 29 | −35.54 |

Numerical Example 12

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 178.783 | 15.20 | 1.59270 | 35.3 | 135.31 | | |
| 2 | 1415.744 | 124.89 | | | 134.26 | | |
| 3 | 108.327 | 15.15 | 1.43387 | 95.1 | 78.98 | 0.5373 | 0.0534 |
| 4 | −192.136 | 0.15 | | | 76.97 | | |
| 5 | −197.207 | 3.00 | 1.85478 | 24.8 | 76.67 | | |
| 6 | 76.176 | 0.15 | | | 71.84 | | |
| 7 | 73.738 | 12.64 | 1.43387 | 95.1 | 72.03 | 0.5373 | 0.0534 |
| 8 | 13386.147 | 11.63 | | | 71.67 | | |
| 9 | 86.704 | 5.89 | 1.89286 | 20.4 | 68.81 | | |
| 10 | 159.733 | 33.10 | | | 67.66 | | |
| 11 | 69.154 | 2.30 | 1.65412 | 39.7 | 49.89 | | |
| 12 | 45.945 | 1.53 | | | 47.30 | | |
| 13 | 55.402 | 8.24 | 1.66672 | 48.3 | 47.22 | | |
| 14 | 2426.623 | 3.00 | | | 45.60 | | |
| 15(aperture stop) | ∞ | (variable) | | | 42.92 | | |
| 16 | 174.740 | 2.00 | 1.90366 | 31.3 | 40.00 | | |
| 17 | 37.347 | 4.13 | 1.49700 | 81.5 | 36.73 | | |
| 18 | 52.890 | (variable) | | | 35.68 | | |
| 19 | 87.342 | 4.14 | 1.84666 | 23.8 | 31.49 | | |
| 20 | 403.419 | 1.07 | | | 31.05 | | |
| 21 | 95.943 | 4.24 | 1.85478 | 24.8 | 32.55 | | |
| 22 | −94.709 | 1.50 | 1.76385 | 48.5 | 32.10 | | |
| 23 | 38.328 | 6.23 | | | 30.47 | | |
| 24 | −80.394 | 1.50 | 1.76385 | 48.5 | 30.84 | | |
| 25 | 109.369 | 3.26 | | | 32.09 | | |
| 26 | 72.385 | 12.53 | 1.67300 | 38.1 | 34.59 | | |
| 27 | −32.147 | 1.70 | 1.59522 | 67.7 | 35.84 | | |
| 28 | −300.120 | 0.15 | | | 37.16 | | |
| 29 | 144.097 | 9.42 | 1.85478 | 24.8 | 37.64 | | |
| 30 | −34.206 | 2.00 | 1.89286 | 20.4 | 37.67 | | |
| 31 | 1892.910 | 62.96 | | | 37.94 | | |
| Image Plane | ∞ | | | | | | |

| Various Data | |
|---|---|
| Focal Length | 392.56 |
| F-number | 2.90 |
| Half Angle of View | 3.15 |
| Image Height | 21.64 |
| Overall Lens Length | 371.23 |
| BF | 62.96 |

| | ∞ | −0.15X |
|---|---|---|
| d12 | 2.00 | 13.67 |
| d15 | 15.51 | 3.84 |

| | |
|---|---|
| Position of Entrance Pupil | 626.88 |
| Position of Exit Pupil | −63.48 |

| Units: mm | |
|---|---|
| Forward Principal Point Position | −199.43 |
| Rear Principal Point Position | −329.61 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 156.52 | 236.90 | 265.60 | −109.21 |
| 2 | 16 | −66.00 | 6.13 | 3.14 | −0.67 |
| 3 | 19 | 520.43 | 47.74 | 46.30 | 13.75 |

| Single Lens Data | | |
|---|---|---|
| Lens | Starting Surface | Focal Length |
| 1 | 1 | 343.67 |
| 2 | 3 | 162.13 |
| 3 | 5 | −63.96 |
| 4 | 7 | 170.85 |
| 5 | 9 | 204.61 |
| 6 | 11 | −217.83 |
| 7 | 13 | 84.92 |
| 8 | 16 | −52.93 |
| 9 | 17 | 234.98 |
| 10 | 19 | 130.88 |
| 11 | 21 | 56.34 |
| 12 | 22 | −35.55 |
| 13 | 24 | −60.45 |
| 14 | 26 | 34.75 |
| 15 | 27 | −60.63 |
| 16 | 29 | 33.15 |
| 17 | 30 | −37.61 |

Numerical Example 13

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 163.339 | 13.35 | 1.59270 | 35.3 | 120.06 | | |
| 2 | 943.811 | 144.80 | | | 118.94 | | |
| 3 | 104.653 | 12.00 | 1.43387 | 95.1 | 61.40 | 0.5373 | 0.0534 |
| 4 | −116.617 | 0.15 | | | 59.82 | | |
| 5 | −117.086 | 2.30 | 1.85478 | 24.8 | 59.62 | | |
| 6 | 80.844 | 0.15 | | | 57.15 | | |
| 7 | 77.117 | 12.13 | 1.43387 | 95.1 | 57.26 | 0.5373 | 0.0534 |
| 8 | −114.243 | 0.15 | | | 57.03 | | |
| 9 | 95.689 | 3.57 | 1.89286 | 20.4 | 54.37 | | |
| 10 | 129.498 | 4.81 | | | 53.26 | | |
| 11 | −174.822 | 2.00 | 1.48749 | 70.2 | 53.26 | | |
| 12 | 146.631 | (variable) | | | 51.87 | | |
| 13 | 107.088 | 10.02 | 1.64769 | 33.8 | 49.80 | | |
| 14 | −72.534 | 2.20 | 1.58913 | 61.1 | 49.14 | | |
| 15 | −4440.551 | (variable) | | | 47.39 | | |
| 16(aperture stop) | ∞ | 8.01 | | | 40.94 | | |
| 17 | 702.560 | 1.90 | 1.84666 | 23.8 | 36.97 | | |
| 18 | 47.597 | 7.46 | 1.61340 | 44.3 | 35.58 | | |
| 19 | −126.474 | 19.15 | | | 35.02 | | |
| 20 | 122.013 | 3.76 | 1.84666 | 23.8 | 26.80 | | |
| 21 | −71.635 | 1.40 | 1.76385 | 48.5 | 26.39 | | |
| 22 | 34.538 | 6.95 | | | 25.37 | | |
| 23 | −64.820 | 1.40 | 1.76385 | 48.5 | 26.15 | | |
| 24 | 90.115 | 2.28 | | | 27.35 | | |
| 25 | 139.671 | 9.08 | 1.73800 | 32.3 | 29.11 | | |
| 26 | −21.978 | 1.70 | 1.76385 | 48.5 | 30.01 | | |
| 27 | −232.122 | 0.96 | | | 32.79 | | |
| 28 | 78.499 | 8.15 | 1.73800 | 32.3 | 34.89 | | |
| 29 | −47.550 | 1.90 | 1.89286 | 20.4 | 35.24 | | |

| Units: mm | | | | |
|---|---|---|---|---|
| 30 | −127.714 | 82.50 | | 35.96 |
| Image Plane | ∞ | | | |

| Various Data | |
|---|---|
| Focal Length | 488.82 |
| F-number | 4.10 |
| Half Angle of View | 2.53 |
| Image Height | 21.64 |
| Overall Lens Length | 411.15 |
| BF | 82.50 |

| | ∞ | −0.14X |
|---|---|---|
| d12 | 43.95 | 24.39 |
| d15 | 2.95 | 22.51 |

| | |
|---|---|
| Position of Entrance Pupil | 760.74 |
| Position of Exit Pupil | −70.30 |
| Forward Principal Point Position | −314.21 |
| Rear Principal Point Position | −406.33 |

| Lens Unit Data | | | | | |
|---|---|---|---|---|---|
| Unit | Starting Surface | Focal Length | Lens Structure Length | Forward Principal Point Position | Rear Principal Point Position |
| 1 | 1 | 680.35 | 195.41 | −475.01 | −383.69 |
| 2 | 13 | 143.84 | 12.22 | 0.85 | −6.65 |
| 3 | 16 | −147.89 | 74.11 | 8.88 | −61.93 |

| Single Lens Data | | |
|---|---|---|
| Lens | Starting Surface | Focal Length |
| 1 | 1 | 331.15 |
| 2 | 3 | 129.25 |
| 3 | 5 | −55.65 |
| 4 | 7 | 108.19 |
| 5 | 9 | 391.00 |
| 6 | 11 | −163.25 |
| 7 | 13 | 68.26 |
| 8 | 14 | −125.19 |
| 9 | 17 | −60.38 |
| 10 | 18 | 57.31 |
| 11 | 20 | 53.79 |
| 12 | 21 | −30.33 |
| 13 | 23 | −49.16 |
| 14 | 25 | 26.36 |
| 15 | 26 | −31.89 |
| 16 | 28 | 41.26 |
| 17 | 29 | −85.80 |

Numerical Example 14

| Units: mm | | | | | | | |
|---|---|---|---|---|---|---|---|
| Surface Data | | | | | | | |
| Surface Number | r | d | nd | vd | Effective Diameter | θgF | ΔθgF |
| 1 | 168.552 | 14.91 | 1.59270 | 35.3 | 133.65 | | |
| 2 | 853.592 | 122.18 | | | 132.49 | | |
| 3 | 148.612 | 11.95 | 1.43387 | 95.1 | 81.00 | 0.5373 | 0.0534 |
| 4 | −254.303 | 0.15 | | | 79.55 | | |
| 5 | −257.480 | 3.20 | 1.85478 | 24.8 | 79.38 | | |
| 6 | 141.530 | 0.15 | | | 76.27 | | |
| 7 | 127.364 | 12.78 | 1.43387 | 95.1 | 76.25 | 0.5373 | 0.0534 |
| 8 | −174.232 | 0.15 | | | 75.68 | | |
| 9 | 577.170 | 3.41 | 1.89286 | 20.4 | 72.87 | | |
| 10 | 4707.875 | 3.60 | | | 72.09 | | |

| | | Units: mm | | | |
|---|---|---|---|---|---|
| 11 | −190.967 | 3.00 | 1.80400 | 46.6 | 72.07 |
| 12 | 1388.400 | (variable) | | | 71.03 |
| 13 | 145.654 | 7.22 | 1.59551 | 39.2 | 58.51 |
| 14 | −226.906 | 2.80 | 1.67790 | 55.3 | 57.84 |
| 15 | 984.208 | (variable) | | | 56.57 |
| 16(aperture stop) | ∞ | 63.32 | | | 45.47 |
| 17 | −414.599 | 1.20 | 1.76385 | 48.5 | 20.91 |
| 18 | 29.784 | 4.80 | 1.54814 | 45.8 | 20.45 |
| 19 | −119.234 | 2.00 | | | 20.87 |
| 20 | 99.170 | 3.22 | 1.78472 | 25.7 | 25.23 |
| 21 | −62.702 | 1.30 | 1.76385 | 48.5 | 25.08 |
| 22 | 48.094 | 3.54 | | | 24.53 |
| 23 | −80.964 | 1.30 | 1.76385 | 48.5 | 24.69 |
| 24 | 140.808 | 1.27 | | | 25.34 |
| 25 | 57.182 | 13.30 | 1.67300 | 38.1 | 24.00 |
| 26 | −35.514 | 1.30 | 1.59522 | 67.7 | 25.49 |
| 27 | 74.378 | 17.60 | | | 26.08 |
| 28 | 112.883 | 7.02 | 1.65412 | 39.7 | 33.62 |
| 29 | −43.326 | 1.70 | 1.89286 | 20.4 | 33.92 |
| 30 | −99.977 | 84.94 | | | 34.71 |
| Image Plane | ∞ | | | | |

| Various Data | |
|---|---|
| Focal Length | 778.70 |
| F-number | 5.83 |
| Half Angle of View | 1.59 |
| Image Height | 21.64 |
| Overall Lens Length | 485.28 |
| BF | 84.94 |

| | ∞ | −0.14X |
|---|---|---|
| d12 | 88.70 | 58.25 |
| d15 | 3.28 | 33.73 |

| | |
|---|---|
| Position of Entrance Pupil | 834.02 |
| Position of Exit Pupil | −132.06 |
| Forward Principal Point Position | −1181.64 |
| Rear Principal Point Position | −693.76 |

Lens Unit Data

| Unit | Starting Surface | Focal Length | Lens Structure Length | Forward Principal Point Position | Rear Principal Point Position |
|---|---|---|---|---|---|
| 1 | 1 | 553.60 | 175.48 | −202.95 | −262.39 |
| 2 | 13 | 326.76 | 10.02 | −1.93 | −8.08 |
| 3 | 16 | −148.91 | 122.87 | 30.61 | −106.67 |

Single Lens Data

| Lens | Starting Surface | Focal Length |
|---|---|---|
| 1 | 1 | 351.50 |
| 2 | 3 | 218.15 |
| 3 | 5 | −106.45 |
| 4 | 7 | 171.79 |
| 5 | 9 | 736.46 |
| 6 | 11 | −208.62 |
| 7 | 13 | 150.05 |
| 8 | 14 | −271.75 |
| 9 | 17 | −36.34 |
| 10 | 18 | 43.98 |
| 11 | 20 | 49.38 |
| 12 | 21 | −35.45 |
| 13 | 23 | −67.13 |
| 14 | 25 | 34.55 |
| 15 | 26 | −40.21 |
| 16 | 28 | 48.73 |
| 17 | 29 | −86.87 |

TABLE 1

|  | Example 1 | Example 2 | Example 3 | Example 4 |
|---|---|---|---|---|
| (1) LD/f | 0.95 | 0.63 | 0.81 | 0.81 |
| (2) D12/LD | 0.27 | 0.27 | 0.32 | 0.26 |
| (3) vdG2p | 95.1 | 95.1 | 95.1 | 95.1 |
| (4) vdG3p | 95.1 | 95.1 | 95.1 | 95.1 |
| (5) ΔθgF_G2p | 0.0534 | 0.0534 | 0.0534 | 0.0534 |
| (6) ΔθgF_G3p | 0.0534 | 0.0534 | 0.0534 | 0.0534 |
| (7) LG2p/(LD − D12) | 0.94 | 0.97 | 0.96 | 0.96 |
| (8) LG3p/(LD − D12) | 0.86 | 0.91 | 0.89 | 0.87 |
| (9) ρG1p | 2.64 | 2.63 | 2.50 | 2.46 |
| (10) fG1p/fG2p | 1.68 | 1.92 | 2.61 | 2.33 |
| (11) fG1p/fG3p | 1.68 | 1.88 | 2.20 | 2.05 |
| (12) |fG1p/fG1n| | 3.97 | 2.22 | 4.05 | 2.19 |
| (13) vdG1n | 24.8 | 32.3 | 32.3 | 38.1 |

|  | Example 5 | Example 6 | Example 7 | Example 8 |
|---|---|---|---|---|
| (1) LD/f | 0.84 | 0.84 | 0.95 | 0.95 |
| (2) D12/LD | 0.24 | 0.23 | 0.20 | 0.21 |
| (3) vdG2p | 95.1 | 95.1 | 95.1 | 95.1 |
| (4) vdG3p | 95.1 | 95.1 | 95.1 | 81.5 |
| (5) ΔθgF_G2p | 0.0534 | 0.0534 | 0.0534 | 0.0534 |
| (6) ΔθgF_G3p | 0.0534 | 0.0534 | 0.0534 | 0.0309 |
| (7) LG2p/(LD − D12) | 0.96 | 0.96 | 0.95 | 0.95 |
| (8) LG3p/(LD − D12) | 0.90 | 0.90 | 0.87 | 0.86 |
| (9) ρG1p | 2.50 | 2.54 | 2.50 | 2.48 |
| (10) fG1p/fG2p | 1.95 | 1.89 | 1.76 | 2.17 |
| (11) fG1p/fG3p | 1.94 | 2.00 | 1.32 | 1.95 |
| (12) |fG1p/fG1n| | 2.93 | 2.91 | 2.31 | 2.14 |
| (13) vdG1n | 32.3 | 35.3 | 32.3 | 34.7 |

|  | Example 9 | Example 10 | Example 11 | Example 12 |
|---|---|---|---|---|
| (1) LD/f | 0.95 | 0.93 | 0.93 | 0.95 |
| (2) D12/LD | 0.22 | 0.18 | 0.24 | 0.34 |
| (3) vdG2p | 95.1 | 95.1 | 95.1 | 95.1 |
| (4) vdG3p | 95.1 | 95.1 | 95.1 | 95.1 |
| (5) ΔθgF_G2p | 0.0534 | 0.0534 | 0.0534 | 0.0534 |
| (6) ΔθgF_G3p | 0.0534 | 0.0534 | 0.0534 | 0.0534 |
| (7) LG2p/(LD − D12) | 0.95 | 0.95 | 0.93 | 0.94 |
| (8) LG3p/(LD − D12) | 0.86 | 0.86 | 0.86 | 0.86 |
| (9) ρG1p | 2.50 | 2.64 | 2.64 | 2.64 |
| (10) fG1p/fG2p | 1.90 | 1.96 | 1.66 | 2.12 |
| (11) fG1p/fG3p | 1.64 | 1.67 | 1.92 | 2.01 |
| (12) |fG1p/fG1n| | 2.52 | 2.05 | 4.64 | 5.37 |
| (13) vdG1n | 32.3 | 24.8 | 24.8 | 24.8 |

|  | Example 13 | Example 14 |
|---|---|---|
| (1) LD/f | 0.84 | 0.62 |
| (2) D12/LD | 0.35 | 0.25 |
| (3) vdG2p | 95.1 | 95.1 |
| (4) vdG3p | 95.1 | 95.1 |
| (5) ΔθgF_G2p | 0.0534 | 0.0534 |
| (6) ΔθgF_G3p | 0.0534 | 0.0534 |
| (7) LG2p/(LD − D12) | 0.95 | 0.96 |
| (8) LG3p/(LD − D12) | 0.90 | 0.92 |
| (9) ρG1p | 2.64 | 2.64 |
| (10) fG1p/fG2p | 2.56 | 1.61 |
| (11) fG1p/fG3p | 3.06 | 2.05 |
| (12) |fG1p/fG1n| | 5.95 | 3.30 |
| (13) vdG1n | 24.8 | 24.8 |

Next, an embodiment of a digital still camera (image pickup apparatus) using any one of the optical systems according to the embodiments as an image pickup optical system is described with reference to FIG. 29. In FIG. 29, reference numeral 10 denotes a camera body and reference numeral 11 denotes an image taking optical system, which is any one of the optical systems according to the first to fourteenth embodiments. Reference numeral 12 denotes a solid-state image pickup element (photoelectric conversion element), such as a CCD sensor or a CMOS sensor, that is installed in the camera body and that receives an image of an object formed by the image taking optical system 11.

By applying any one of the optical systems according to the embodiments to an image pickup apparatus, such as a digital still camera in this way, it is possible to provide a light image pickup apparatus whose aberrations, such as chromatic aberrations, are properly corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-109656 filed Jun. 1, 2016, which is hereby incorporated by reference herein in its entirety.

What is claimed is:

1. An optical system comprising:
a first lens unit having a positive refractive power;
a second lens unit having a positive refractive power or a negative refractive power; and
a third lens unit having a positive refractive power or a negative refractive power,
wherein the first lens unit, the second lens unit, and the third lens unit are disposed in that order from an object side to an image side,
wherein, during focusing, the second lens unit is arranged to move to change an interval between adjacent lens units,
wherein the first lens unit includes a positive lens G1p that is disposed closest to the object side, a positive lens G2p that is disposed closer to the image side than the positive lens G1p, and a positive lens G3p that is disposed closer to the image side than the positive lens G2p, and
wherein the following conditional expressions are satisfied:

$LD/f < 1.0;$ $0.200 \leq D12/LD < 0.500;$ $vdG2p > 73.0;$ and $vdG3p > 73.0,$ wherein f is a focal length of the optical system, LD is a distance along an optical axis from a lens surface of the first lens unit that is closest to the object side to an image plane, D12 is a distance along the optical axis between an image side lens surface of the positive lens G1p and an object side lens surface of a lens that is disposed adjacent to the image side of the positive lens G1p, vdG2p is an Abbe number of a material of the positive lens G2p, and vdG3p is an Abbe number of a material of the positive lens G3p.

2. The optical system according to claim 1, wherein the following conditional expression is satisfied:

$0.020 < \theta gF\_G2p - (0.6438 - 0.001682 \times vdG2p) < 0.100,$ where θgF_G2p is a partial dispersion ratio of the material of the positive lens G2p.

3. The optical system according to claim 1, wherein the following conditional expression is satisfied:

$0.020 < \theta gF\_G3p - (0.6438 - 0.001682 \times vdG3p) < 0.100,$ where θgF_G3p is a partial dispersion ratio of the material of the positive lens G3p.

4. The optical system according to claim 1, wherein the following conditional expression is satisfied:

$$LG2p/(LD-D12)>0.80,$$

where LG2p is a distance along the optical axis from an object-side lens surface of the positive lens G2p to the image plane.

5. The optical system according to claim 1, wherein the following conditional expression is satisfied:

$$LG3p/(LD-D12)>0.70,$$

where LG3p is a distance along the optical axis from an object-side lens surface of the positive lens G3p to the image plane.

6. The optical system according to claim 1, wherein the following conditional expression is satisfied:

$$pG1p<3.0 \text{ [g/cm}^3\text{]},$$

where pG1p is a specific gravity of the material of the positive lens G1p.

7. The optical system according to claim 1, wherein the second lens unit includes a positive lens and a negative lens.

8. The optical system according to claim 1, wherein the second lens unit includes two lenses or less.

9. The optical system according to claim 1, wherein the following conditional expression is satisfied:

$$1.50<fG1p/fG2p<5.00,$$

where fG1p is a focal length of the positive lens G1p, and fG2p is a focal length of the positive lens G2p.

10. The optical system according to claim 1, wherein the following conditional expression is satisfied:

$$1.30<fG1p/fG3p<5.00,$$

where fG1p is a focal length of the positive lens G1p, and fG3p is a focal length of the positive lens G3p.

11. The optical system according to claim 1, wherein the following conditional expression is satisfied:

$$20.0<vdG1n<40.0$$

where vdG1n is an Abbe number of a material of a negative lens Gln that is disposed closest to the object side among negative lenses included in the first lens unit.

12. An optical system comprising:
a first lens unit having a positive refractive power;
a second lens unit having a positive refractive power or a negative refractive power; and
a third lens unit having a positive refractive power or a negative refractive power,
wherein the first lens unit, the second lens unit, and the third lens unit are disposed in that order from an object side to an image side,
wherein, during focusing, the second lens unit is arranged to move to change an interval between adjacent lens units,
wherein the first lens unit includes a positive lens G1p that is disposed closest to the object side, a positive lens G2p that is disposed adjacent to the image side of the positive lens G1p, a positive lens G3p that is disposed closer to the image side than the positive lens G2p, and at least one negative lens, and
wherein the following conditional expressions are satisfied:

$$LD/f<1.0;$$

$$0.170<D12/LD<0.500;$$

$$vdG2p>73.0;$$

$$vdG3p>73.0, \text{ and}$$

$$1.80<|fG1p/fG1n|<10.00$$

where f is a focal length of the optical system, LD is a distance along an optical axis from a lens surface of the first lens unit that is closest to the object side to an image plane, D12 is a distance along the optical axis between an image side lens surface of the positive lens G1p and an object side lens surface of the positive lens G2p, vdG2p is an Abbe number of a material of the positive lens G2p, vdG3p is an Abbe number of a material of the positive lens G3p, fG1p is a focal length of the positive lens G1p, and fG1n is a focal length of a negative lens Gln that is disposed closest to the object side among the at least one negative lens included in the first lens unit.

13. An image pickup apparatus comprising:
an optical system; and
an image pickup element arranged to receive an image that is formed by the optical system,
wherein the optical system includes a first lens unit having a positive refractive power, a second lens unit having a positive refractive power or a negative refractive power; and a third lens unit having a positive refractive power or a negative refractive power,
wherein the first lens unit, the second lens unit, and the third lens unit are disposed in that order from an object side to an image side,
wherein, during focusing, the second lens unit is arranged to move to change an interval between adjacent lens units,
wherein the first lens unit includes a positive lens G1p that is disposed closest to the object side, a positive lens G2p that is disposed closer to the image side than the positive lens G1p, and a positive lens G3p that is disposed closer to the image side than the positive lens G2p, and
wherein the following conditional expressions are satisfied:

$$LD/f<1.0;$$

$$0.200 \leq D12/LD<0.500;$$

$$vdG2p>73.0; \text{ and}$$

$$vdG3p>73.0.$$

where f is a focal length of the optical system, LD is a distance along an optical axis from a lens surface of the first lens unit that is closest to the object side to an image plane, D12 is a distance along the optical axis between an image side lens surface of the positive lens G1p and an object side lens surface of a lens that is disposed adjacent to the image side of the positive lens G1p, vdG2p is an Abbe number of a material of the positive lens G2p, and vdG3p is an Abbe number of a material of the positive lens G3p.

* * * * *